(12) United States Patent
Hattori et al.

(10) Patent No.: US 12,269,487 B2
(45) Date of Patent: Apr. 8, 2025

(54) WHEEL LOAD ESTIMATION DEVICE

(71) Applicant: KABUSHIKI KAISHA TOYOTA JIDOSHOKKI, Kariya (JP)

(72) Inventors: Tatsuya Hattori, Kariya (JP); Hiroyuki Yamaguchi, Nagakute (JP); Daiki Mori, Nagakute (JP); Yoshikazu Hattori, Nagakute (JP); Noriyoshi Suzuki, Nagakute (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 91 days.

(21) Appl. No.: 18/031,408

(22) PCT Filed: Jul. 28, 2021

(86) PCT No.: PCT/JP2021/027881
§ 371 (c)(1),
(2) Date: Apr. 12, 2023

(87) PCT Pub. No.: WO2022/079973
PCT Pub. Date: Apr. 21, 2022

(65) Prior Publication Data
US 2023/0373497 A1    Nov. 23, 2023

(30) Foreign Application Priority Data
Oct. 13, 2020   (JP) .................. 2020-172729

(51) Int. Cl.
*B60W 40/13*   (2012.01)
*B66F 17/00*   (2006.01)

(52) U.S. Cl.
CPC .......... *B60W 40/13* (2013.01); *B66F 17/003* (2013.01); *B60W 2300/121* (2013.01)

(58) Field of Classification Search
CPC ......... B60W 40/13; B60W 2040/1307; B60W 2040/1315; B60W 2040/1338;
(Continued)

(56) References Cited

U.S. PATENT DOCUMENTS 7,216,024 B1    5/2007   Abels et al.
2005/0281650 A1*  12/2005  Bozem .................. B66F 17/003
                                                        414/490

FOREIGN PATENT DOCUMENTS

JP   2001-063991 A   3/2001
JP   2004-058960 A   2/2004
(Continued)

OTHER PUBLICATIONS

WO-2015098166-A1 translate (Year: 2015).*
Extended European Search Report issued Mar. 19, 2024 in Application No. 21879715.7.

*Primary Examiner* — Yufeng Zhang
(74) *Attorney, Agent, or Firm* — Sughrue Mion, PLLC

(57) ABSTRACT

A wheel load estimation device includes an obtaining unit obtaining angular velocities and angular accelerations of a rigid body including an element, accelerations of the rigid body in a front-rear direction and in a lateral direction, a weight of the element, and a position including a height of the element. The element fluctuates a center of gravity of the rigid body. A center-of-gravity inertia value calculation unit calculates information relevant to the center of gravity of the rigid body and an inertia value. A wheel load variation calculation unit calculates variation amounts of wheel loads that each act on a corresponding one of a plurality of wheels supporting the rigid body. A wheel load estimation unit estimates the wheel loads.

9 Claims, 12 Drawing Sheets

(58) Field of Classification Search
CPC ............ B60W 2300/121; B66F 17/003; B66F 9/0755; B66F 9/24; G01G 19/083; B60T 2240/06
See application file for complete search history.

(56) References Cited

FOREIGN PATENT DOCUMENTS

| | | | | |
|---|---|---|---|---|
| JP | 2009-175148 A | 8/2009 | | |
| JP | 2013-216278 A | 10/2013 | | |
| WO | WO-2015098166 A1 * | 7/2015 | .............. | B60L 1/003 |

* cited by examiner

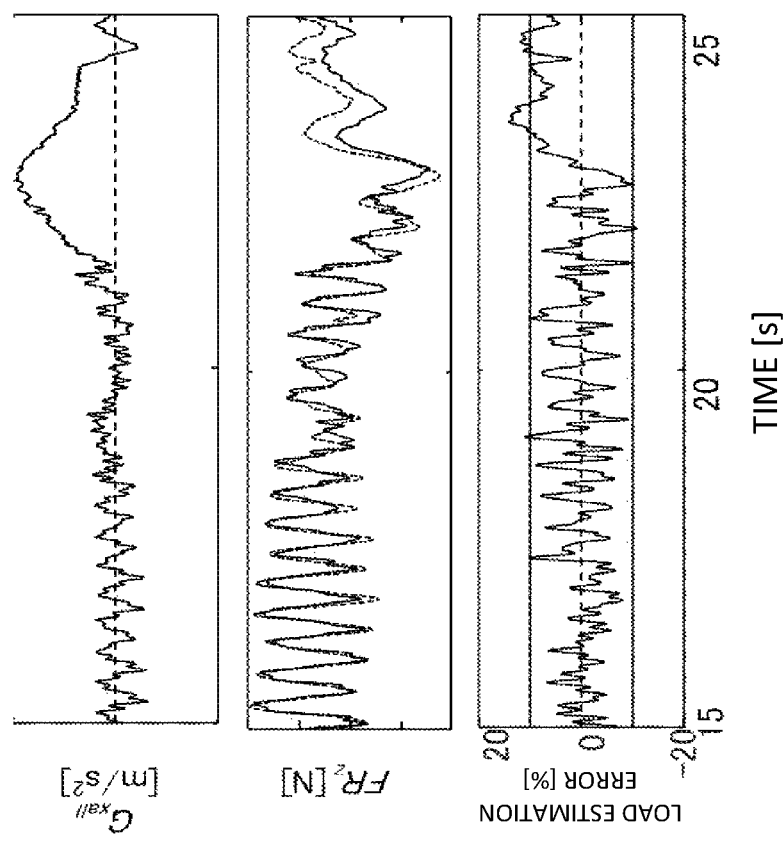
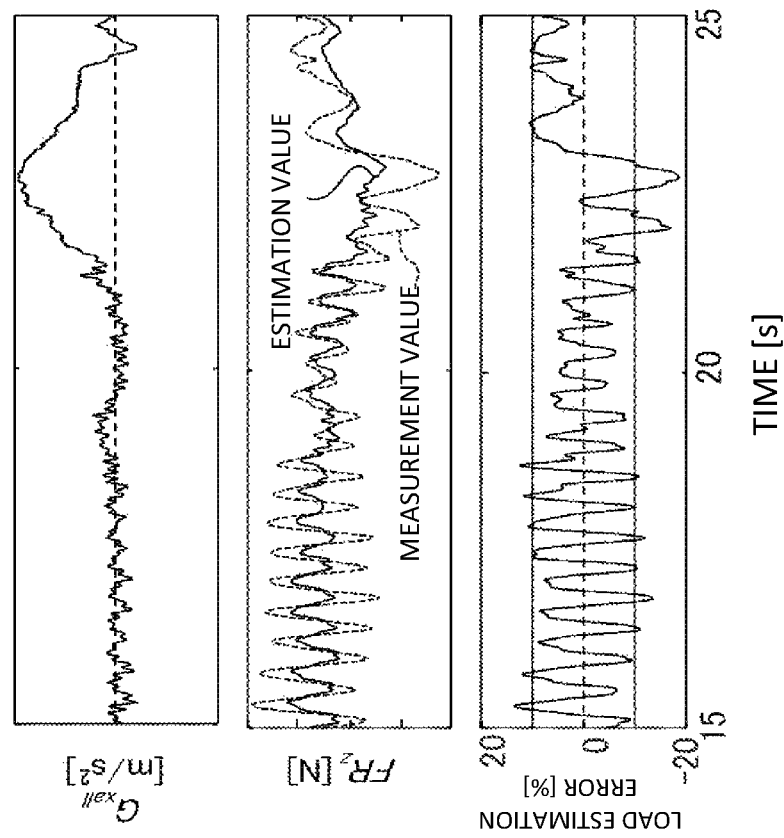
FIG. 12A
FIG. 12B

WHEEL LOAD ESTIMATION DEVICE

CROSS-REFERENCE TO RELATED APPLICATIONS

This application is a National Stage of International Application No. PCT/JP2021/027881 filed Jul. 28, 2021, claiming priority based on Japanese Patent Application No. 2020-172729 filed Oct. 13, 2020, the contents of all of which are incorporated herein by reference in their entirety.

TECHNICAL FIELD

The present disclosure relates to a wheel load estimation device and a wheel load estimation program.

BACKGROUND ART

Conventionally, in a vehicle such as a forklift that lifts a loading object and travels, it has estimated the load on each wheel supporting the vehicle for avoiding the danger of wheel rise, vehicle overturn, and the like due to the deviation of the center of gravity of the vehicle.

For example, there has been proposed a technique in which front-rear and lateral accelerations, a roll angular velocity, and a pitch angular velocity are measured in four-wheel vehicles (see Patent Document 1). In this technique, the load on each wheel is estimated based on a pitch moment for which a vertical rigidity of each wheel, a front-rear directional behavior of the vehicle, the inclination of a roll inertial principal axis, and a gyro effect are considered, and a roll moment for which a lateral directional behavior of the vehicle is considered.

Further, for example, there has been proposed a technique in which front-rear and lateral accelerations, a roll angular velocity, and a pitch angular velocity are measured in four-wheel vehicles (see Patent Document 2). In this technique, the load on each wheel is estimated based on a pitch moment by a front-rear directional behavior of the vehicle, a roll moment by a lateral directional behavior of the vehicle, and a pitch inertia and roll inertia of the vehicle.

Further, for example, there has been proposed a technique in which the load on each wheel and the wheel speed of two driving wheels are measured in forklifts (see Patent Document 3). In this technique, the wheel speed is used for the calculation of a turning radius, and a steering amount and a braking/driving torque are adjusted depending on the decrease in measurement value of wheel load on each wheel.

CITATION LIST

Patent Documents

Patent Document 1: Japanese Patent Application Publication No. 2004-058960
Patent Document 2: Japanese Patent Application Publication No. 2013-216278
Patent Document 3: Japanese Patent Application Publication No. 2001-063991

SUMMARY OF INVENTION

Technical Problem

However, the techniques described in Patent Documents 1 and 2 are intended for use in general four-wheel vehicles, and travelling situation while a loading object having a heavy weight is loaded in various states as in the case of forklifts, for example, is not considered. For that reason, there is a problem that the wheel load of a vehicle that travels while a loading object having a heavy weight is loaded in various states is not estimated appropriately by the techniques described in Patent Documents 1 and 2.

In the technique described in Patent Document 3, the strain of a portion on which the loading object is loaded is used for measuring the wheel load. However, it is necessary to decrease the rigidity of the portion on which the loading object is loaded for obtaining the strain, and there is a problem that of occurrence of safety risk.

The present disclosure, which has been made in view of the above circumstance, is to provide a wheel load estimation device and program that accurately estimate a wheel load without decreasing a rigidity of a rigid body even in a case where a center of gravity of the rigid body fluctuates.

Solution to Problem

In order to solve the above object, a wheel load estimation device according to the present disclosure includes an obtaining unit obtaining angular velocities and angular accelerations of a rigid body around three axes of the rigid body including an element, accelerations of the rigid body in a front-rear direction being a traveling direction of the rigid body and in a lateral direction being a width direction of the rigid body, a weight of the element, and a position including a height of the element, the element fluctuating a center of gravity of the rigid body, a center-of-gravity inertia value calculation unit calculating information relevant to the center of gravity of the rigid body and an inertia value including an inertial principal axis around the center of gravity of the rigid body, a wheel load variation calculation unit calculating variation amounts of wheel loads that each act on a corresponding one of a plurality of wheels supporting the rigid body based on the angular velocities, the angular accelerations, and the accelerations in the front-rear direction and the lateral direction obtained by the obtaining unit, and the information relevant to the center of gravity of the rigid body and the inertia value calculated by the center-of-gravity inertia value calculation unit, and a wheel load estimation unit estimating the wheel loads based on the variation amounts of the wheel loads calculated by the wheel load variation calculation unit and static loads that act on the respective wheels.

With the wheel load estimation device according to the present disclosure, the obtaining unit obtains the angular velocities and angular accelerations of the rigid body around the three axes of the rigid body including the element that fluctuates the center of gravity of the rigid body, the accelerations in the front-rear direction being the traveling direction of the rigid body and the lateral direction being the width direction of the rigid body, the weight of element, and the position including the height of the element. The center-of-gravity inertia value calculation unit calculates the information relevant to the center of gravity of the rigid body, and calculates the inertia value including the inertial principal axis around the center of gravity of the rigid body. The wheel load variation calculation unit calculates the variation amounts of the wheel loads that each act on the corresponding one of the plurality of wheels supporting the rigid body based on the angular velocities, the angular accelerations, the accelerations in the front-rear direction and the lateral direction obtained by the obtaining unit, and the information relevant to the center of gravity of the rigid body and the inertia value calculated by the center-of-gravity inertia value calculation unit. The wheel load estimation unit estimates the wheel loads based on the variation amounts of the wheel loads calculated by the wheel load variation calculation unit, and the static loads that act on the respective wheels. Thus, it is possible to accurately estimate the wheel load without decreasing the rigidity of the rigid body even in the case where the center of gravity of the rigid body fluctuates.

The center-of-gravity inertia value calculation unit calculates a position of the center of gravity of the rigid body including the element and respective positions of centers of gravity of a plurality of constituent parts constituting the rigid body based on the weight and the position of the element obtained by the obtaining unit and respective structures of the constituent parts, and calculates the inertia value using differences between the position of the center-of-gravity of the rigid body including the element and the respective positions of the centers of gravity of the constituent parts.

The center-of-gravity inertia value calculation unit may calculate the inertia value further including inertial products. Thus, the inertia value depending on the fluctuation of the center of gravity is more appropriately calculated, and it is possible to more accurately estimate the wheel load.

The obtaining unit obtains lateral forces and front-rear forces that act on the wheels, and the wheel load variation calculation unit calculates the variation amounts of the wheel loads further using a yaw moment around the center of gravity of the rigid body, the yaw moment being calculated based on the lateral forces and the front-rear forces obtained by the obtaining unit. Thus, it is possible to estimate the wheel load in consideration of the yaw moment around the center of gravity of the rigid body.

The wheel load variation calculation unit may calculate a yaw moment around the center of gravity of the rigid body together with the variation amounts of the wheel loads under the constraint that the total sum of the respective variation amounts of the wheel loads on the plurality of wheels is 0. Thus, it is possible to calculate the yaw moment together with the wheel load based on the information obtained by the obtaining unit.

The rigid body may be a vehicle, and the element fluctuating the center of gravity may be a loading object that is loaded on the vehicle. Further, the vehicle may be a forklift, and the loading object may be loaded on forks being operable vertically. Thus, it is possible to accurately estimate the wheel load for a vehicle that travels while the loading object is loaded in various states, as exemplified by a forklift.

The information relevant to the center of gravity of the rigid body may include a distance in a vertical direction between the position of the center of gravity of the rigid body and a roll center of the rigid body, a position of the center of gravity of the rigid body in the lateral direction, and respective distances in the lateral direction between the plurality of wheels and the position of the center of gravity of the rigid body.

A wheel load estimation program according to the present disclosure is a program for causing a computer to function as the units of the above-described wheel load estimation device.

Advantageous Effect of Disclosure

With the wheel load estimation device and program in the present disclosure, it is possible to accurately estimate the wheel load without decreasing the rigidity of the rigid body even in the case where the center of gravity of the rigid body fluctuates.

BRIEF DESCRIPTION OF DRAWINGS

FIGS. 12A and 12B are diagrams for explaining an effect of changing an inertia value depending on a lift height.

DESCRIPTION OF EMBODIMENTS

The following will describe embodiments according to the present disclosure with reference to the drawings.

First Embodiment

Firstly, a principle of a first embodiment will be described. In the first embodiment, estimation of the load on each wheel in a forklift that includes four wheels as front, rear, right, and left wheels and that travels while a loading object is loaded on forks being operatable vertically will be described. The forklift serves as an example of a rigid body including an element that fluctuates the center of gravity. Further, in the first embodiment, it is premised that a vehicle behavior including the front-rear acceleration, lateral acceleration, roll angular velocity, pitch angular velocity, and yaw angular velocity of the forklift is measured. In the first embodiment, it is also premised that the weight of the loading object, the lift height, and the loading position of the loading object with respect to the forks may be detected.

Figure 1A:
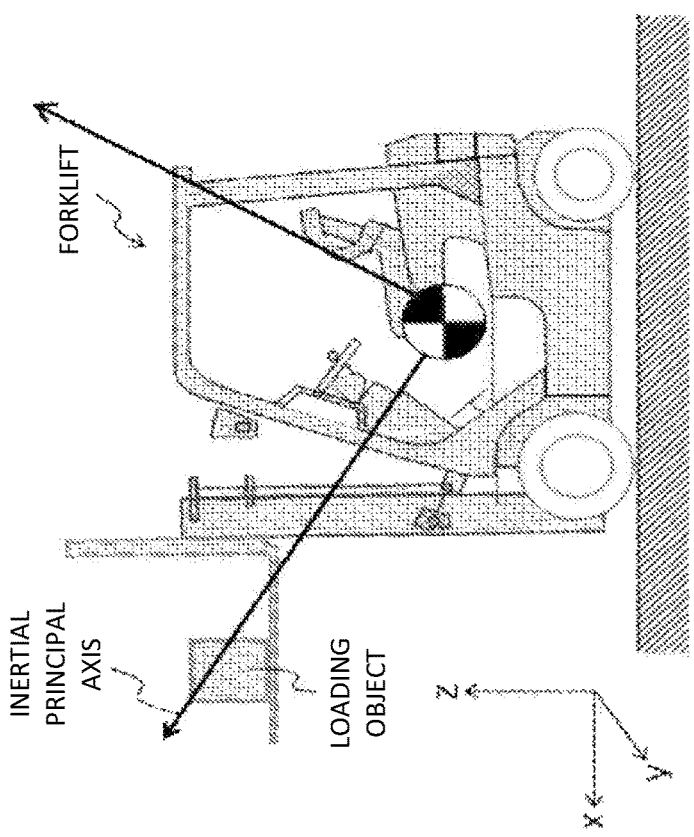
FIGS. 1A and 1B are image diagrams schematically illustrating a difference in an inertial principal axis depending on a difference in a lift height of a loading object.
Figure 1B:
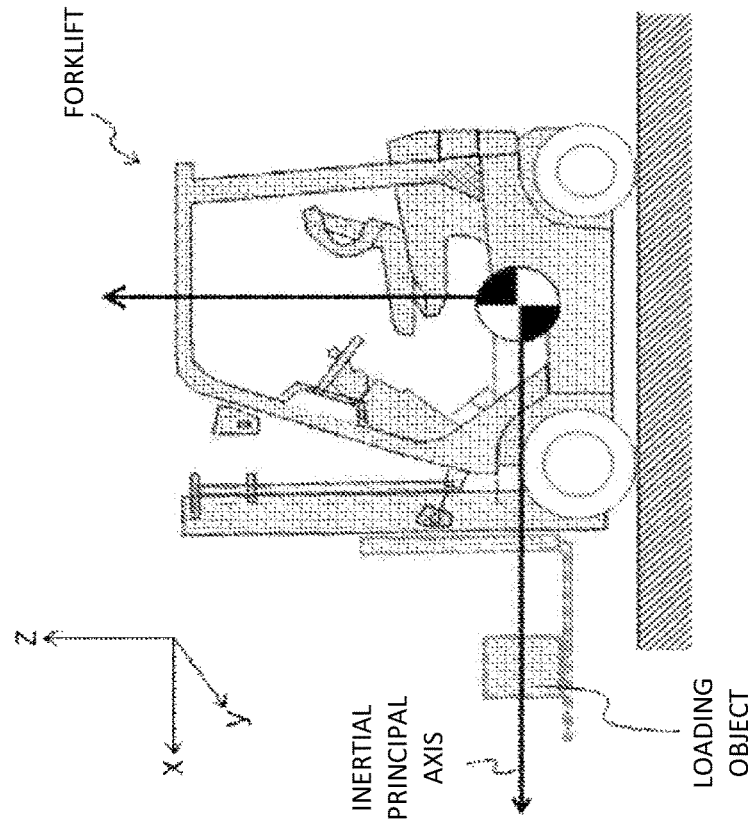

Unlike passenger cars, the forklift travels in states where the loading object having a heavy weight is lifted at various lift heights. The loading object is sometimes located in a located position shifted from the position of the center-of-gravity of the forklift in a y-direction (lateral direction of the forklift). Depending on the loading state of the loading object, the orientation of an inertial principal axis changes with respect to the rotation axes for roll, pitch, and yaw. Hence, in the first embodiment, the inertial principal axis and inertial products are set depending on the loading state of the loading object. FIG. 1 is an image diagram schematically illustrating the difference in the inertial principal axis depending on the difference in the lift height of the loading object. The orientation of the inertial principal axis varies between a case where the height of the lift on which the loading object is loaded is low as illustrated in FIG. 1A and a case where the height of the lift is high as illustrated in FIG. 1B.

Figure 2:
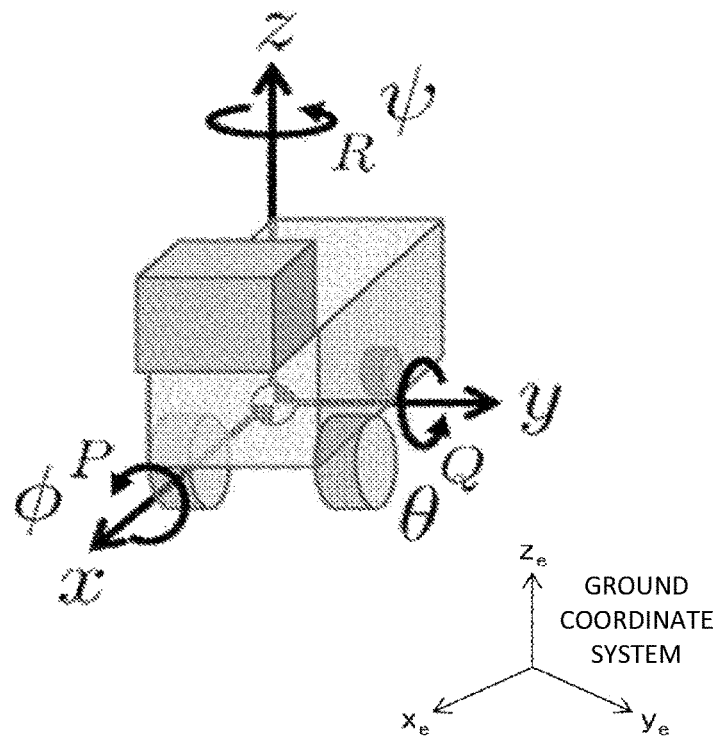
FIG. 2 is a diagram for explaining a vehicle coordinate system relative to a ground coordinate system.

A vehicle motion will be described using a six degree-of-freedom model for vehicles that is illustrated in FIG. 2 and expressed by the following equations (1) to (3) in order to dealing with the difference in the loading state of the loading object illustrated in FIG. 1. The equation (1) is an equation that expresses the rotary motion of the vehicle, the equation (2) is an equation that expresses the translational motion of the vehicle, and the equation (3) is an equation that expresses the attitude of a vehicle coordinate system (an x-y-z coordinate system in FIG. 2) relative to a ground coordinate system ($x_e$-$y_e$-$z_e$ coordinate system in FIG. 2). In the vehicle coordinate system, the front-rear direction (travelling direction) of the vehicle corresponds to the x-axis direction, the lateral direction (width direction) of the vehicle corresponds to the y-axis direction, and the vertical direction corresponds to the z-axis direction.

[Formula 1]

$$\begin{bmatrix} \dot{P} \\ \dot{Q} \\ \dot{R} \end{bmatrix} = J_{all}^{-1}\left(-\begin{bmatrix} 0 & -R & Q \\ R & 0 & -P \\ -Q & P & 0 \end{bmatrix} J_{all} \begin{bmatrix} P \\ Q \\ R \end{bmatrix} + \begin{bmatrix} L_v \\ M_v \\ N_v \end{bmatrix}\right) \quad (1)$$

-continued $$\begin{bmatrix} \dot{U} \\ \dot{V} \\ \dot{W} \end{bmatrix} = -\begin{bmatrix} 0 & -R & Q \\ R & 0 & -P \\ -Q & P & 0 \end{bmatrix} \begin{bmatrix} U \\ V \\ W \end{bmatrix} + g\begin{bmatrix} -\sin\theta \\ \sin\phi\cos\theta \\ \cos\phi\cos\theta \end{bmatrix} + \frac{1}{M_{all}}\begin{bmatrix} X_v \\ Y_v \\ Z_v \end{bmatrix} \quad (2)$$

$$\begin{bmatrix} \dot{\phi} \\ \dot{\theta} \\ \dot{\psi} \end{bmatrix} = \begin{bmatrix} 1 & \sin\phi\tan\theta & \cos\phi\tan\theta \\ 0 & \cos\phi & -\sin\phi \\ 0 & \sin\phi/\cos\theta & \cos\phi/\cos\theta \end{bmatrix}\begin{bmatrix} P \\ Q \\ R \end{bmatrix} \quad (3)$$

In the equations (1) to (3), P, Q, and R are respective angular velocities [rad/s] for roll, pitch, and yaw, and $L_v$, $M_v$, and $N_v$ are respective moments [Nm] for roll, pitch, and yaw. U, V, and W are velocities [m/s] in the respective directions of the x, y, and z-axes in the vehicle coordinate system, and ϕ, θ, and φ are attitude angles [rad] of the vehicle coordinate system relative to the ground coordinate system. $X_v$, $Y_v$, and $Z_v$ are a front-rear force, lateral force, and vertical force [N] that act on the vehicle. $J_{all}$ is an inertial tensor [kg·m²] constituted by the inertial principal axis and the inertial products in the respective directions of the x, y, and z-axes, and $M_{all}$ is a total weight [kg] obtained from adding the weight of the loading object to the weight of the vehicle. The inertia tensor corresponds to an example of an "inertia value" in the present disclosure.

Figure 3:
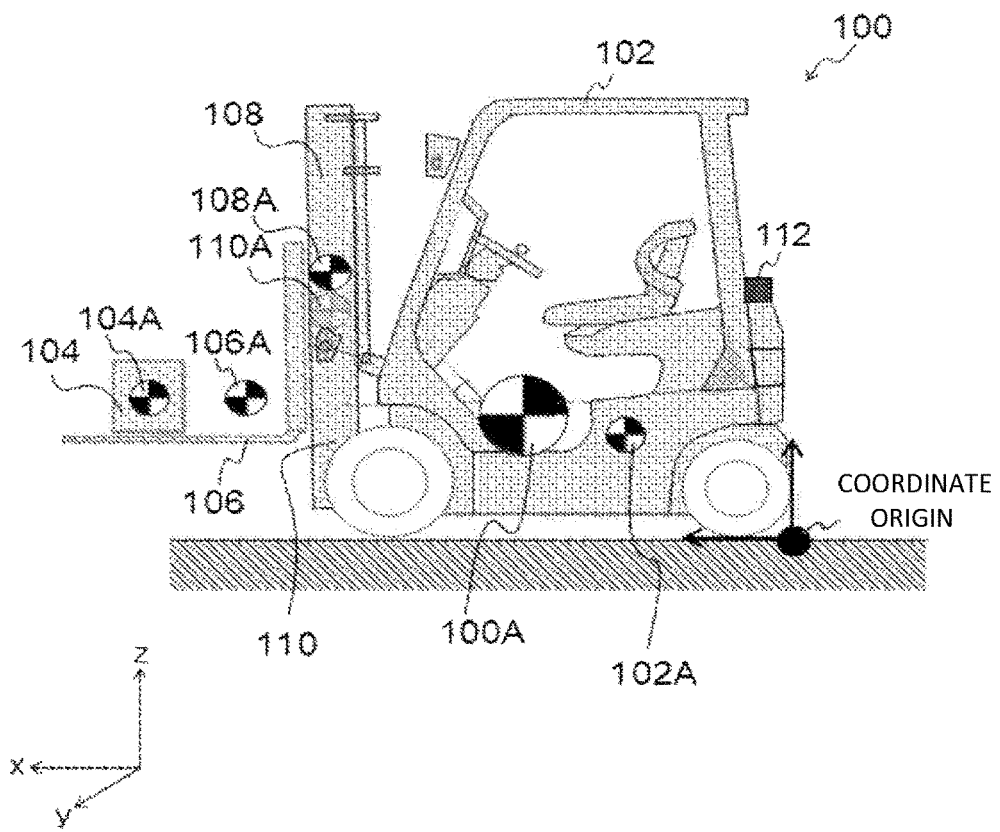
FIG. 3 is a diagram illustrating outlines of constituent elements of a whole vehicle, centers of gravity, and a coordinate origin.

In the first embodiment, a portion in the equation (1) that is relevant to the rotary motion of the vehicle is used. The setting of the inertia tensor $J_{all}$ in the equation (1) will be described with reference to FIG. 3. FIG. 3 illustrates outlines of respective constituent parts of a forklift (referred to as a "whole vehicle", hereinafter) 100 including the loading object, the centers of gravity of the respective constituent parts, the centers of gravity of the whole vehicle, and the coordinate origin. In the example in FIG. 3, a vehicle body 102, a loading object 104, forks 106, an outer mast 108, and an inner mast 110 are assumed as the constituent parts of the forklift. The constituent parts of the forklift also includes an IMU (Inertial Measurement Unit) 112, but the IMU 112 is regarded as being very light and having no influence on the center of gravity of the whole vehicle 100. In FIG. 3, a mark indicating the center of gravity is illustrated at a position of the center-of-gravity of each constituent part, and the position of the center of gravity of each constituent part is represented by a reference character in which "A" is added to the tail end of the reference character for the constituent part. The size of a circle of the mark indicating the positions of the centers of gravity schematically expresses the magnitude of the weight of each constituent part.

The configuration of the inertia tensor $J_{all}$ is expressed by the following equation (4). On the right-hand side in the equation (4), diagonal elements represent an inertial principal axis, and off-diagonal elements represent inertial products.

[Formula 2]

$$J_{all} = \begin{bmatrix} \sum_{j=1}^{N} m_j \cdot (\Delta y_j^2 + \Delta z_j^2) & -\sum_{j=1}^{N} m_j \cdot (\Delta x_j \cdot \Delta y_j) & -\sum_{j=1}^{N} m_j \cdot (\Delta x_j \cdot \Delta z_j) \\ -\sum_{j=1}^{N} m_j \cdot (\Delta x_j \cdot \Delta y_j) & \sum_{j=1}^{N} m_j \cdot (\Delta x_j^2 + \Delta z_j^2) & -\sum_{j=1}^{N} m_j \cdot (\Delta y_j \cdot \Delta z_j) \\ -\sum_{j=1}^{N} m_j \cdot (\Delta x_j \cdot \Delta z_j) & -\sum_{j=1}^{N} m_j \cdot (\Delta y_j \cdot \Delta z_j) & \sum_{j=1}^{N} m_j \cdot (\Delta x_j^2 + \Delta y_j^2) \end{bmatrix} \quad (4)$$

In the equation (4), an index j represents a variable that specifies each constituent part, N represents the total number of constituent parts, and $m_j$ represents the weight of a constituent part j. When the center of gravity of the whole vehicle 100 is represented as $CG_{all}$, the position ($x_{all}$, $y_{all}$, $z_{all}$) of $CG_{all}$ is calculated using the weight of the loading object 104, the lift height, and the loading position of the loading object 104 with respect to the forks 106. In the equation (4), $\Delta x_j$, $\Delta y_j$, and $\Delta z_j$ are differences in the respective axis directions between a position 100A of the center of gravity $CG_{all}$ of the whole vehicle 100 and respective positions 102A, 104A, 106A, 108A, 110A of the centers of gravity of the constituent parts j, and are calculated by the following equations (5).

[Formula 3]

$$\Delta x_j = x_j - x_{all},\ \Delta y_j = y_j - y_{all},\ \Delta z_j = z_j - z_{all} \quad (5)$$

The respective accelerations (P, Q, and R) for roll, pitch, and yaw and the front-rear acceleration and lateral acceleration of the center of gravity $CG_{all}$ of the whole vehicle 100 are measured by the IMU 112, and a yaw moment $N_v$ is obtained by the detection of a tire front-rear force and a tire lateral force. Further, $\dot{P}$ (in the equations, "•(dot)" is above "P"; the same goes for Q and R described below), $\dot{Q}$, and $\dot{R}$ in the equation (1) are calculated by the approximate differentiation, or the like of P, Q, and R measured at each sampling timing. In this case, only the wheel load is an unknown parameter in the equation (1).

More details will be described below. The roll moment $L_v$ and the pitch moment $M_v$ in the equation (1) are expressed as the sum of a moment acting on the vehicle by the tire lateral force and the tire front-rear force and a moment by the reaction force of a tire spring (vertical spring) by the following equation (6) and equation (7).

[Formula 4]

$$L_v = M_{all} \cdot G_{yall} \cdot h_{R\_CG} + (\Delta FL_Z + \Delta RL_Z) \cdot t_l - (\Delta FR_Z + \Delta RR_Z) \cdot t_r \quad (6)$$

$$M_v = M_{all} \cdot G_{xall} \cdot h_{CG} - (\Delta FL_Z + \Delta FR_Z) \cdot l_f - (\Delta RL_Z + \Delta RR_Z) \cdot l_r \quad (7)$$

$G_{xall}$ and $G_{yall}$ in the equation (6) and the equation (7) represent the front-rear acceleration and lateral acceleration [m/s$^2$] of the center of gravity $CG_{all}$ of the whole vehicle 100. $h_{R\_CG}$ represents a z-directional distance ($=z_{all}-h_R$) [m] between $CG_{all}$ and a roll center $h_R$, and $h_{CG}$ represents a z-directional distance ($=z_{all}$) [m] of $CG_{all}$. $t_l$ and $t_r$ represent y-directional distances [m] from $CG_{all}$ to the right and left wheels, and $l_f$ and $l_r$ represent x-directional distances [m] from $CG_{all}$ to the front and rear wheels. $\Delta FL_z$, $\times FR_z$, $\Delta RL_z$, and $\Delta RR_z$ represent variation amounts [N] of the wheel loads on the front, rear, right, and left wheels.

The equation (6) and the equation (7) express moments around the center of gravity $CG_{all}$ of the whole vehicle 100, and express a tire front-rear force sum and a lateral force sum for the respective wheels using the front-rear acceleration $G_{xall}$ and lateral acceleration $G_{yall}$ of the center of gravity $CG_{all}$ of the vehicle and the weight $M_{all}$. In the case where the IMU 112 is attached to any suitable position on the vehicle body 102 as illustrated in FIG. 3, measurement values $G_x$, $G_y$ of the IMU 112 are converted into the acceleration at the position of the center of gravity $CG_{all}$ of the whole vehicle 100. The yaw moment $N_v$ is expressed as the sum of moments by tire front-rear forces $FL_{Fx}$, $FR_{Fx}$ of the two driving wheels and tire lateral forces $FL_{Fy}$, $FR_{Fy}$, $RL_{Fy}$, $RR_{Fy}$ of the respective wheels, by the following equation (8).

[Formula 5]

$$N_v = -FL_{Fx} \cdot t_l + FR_{Fx} \cdot t_r + (FL_{Fy} + FR_{Fy}) \cdot l_f - (RL_{Fy} + RR_{Fy}) \cdot l_r \quad (8)$$

The tire front-rear forces $FL_{Fx}$, $FR_{Fx}$ and the tire lateral forces $FL_{Fy}$, $FR_{Fy}$, $RL_{Fy}$, $RR_{Fy}$ are values converted to values in the vehicle coordinate system. When the equation (1) is expressed using the equations (4) to (8) and the variation amounts of the respective wheel loads that are unknown parameters are obtained, the following equation (9) is satisfied.

[Formula 6]

$$\begin{bmatrix} \Delta FL_{z(i)} \\ \Delta FR_{z(i)} \\ \Delta RL_{z(i)} \\ \Delta RR_{z(i)} \end{bmatrix} \approx \begin{bmatrix} t_l & -t_r & t_l & -t_r \\ -l_f & -l_f & l_r & l_r \\ 0 & 0 & 0 & 0 \end{bmatrix}^+ \cdot \quad (9)$$

$$\left( J_{all} \cdot \begin{bmatrix} \dot{P}_{(i)} \\ \dot{Q}_{(i)} \\ \dot{R}_{(i)} \end{bmatrix} + \begin{bmatrix} 0 & -R_{(i)} & Q_{(i)} \\ R_{(i)} & 0 & -P_{(i)} \\ -Q_{(i)} & P_{(i)} & 0 \end{bmatrix} \cdot J_{all} \cdot \begin{bmatrix} P_{(i)} \\ Q_{(i)} \\ R_{(i)} \end{bmatrix} + \begin{bmatrix} -M_{all} \cdot G_{yall(i)} \cdot h_{R\_CG} \\ M_{all} \cdot G_{xall(i)} \cdot h_{CG} \\ N_{v(i)} \end{bmatrix} \right)$$

In the equation (9), the first matrix on the right-hand side, which is the 3×4 matrix added "+" on the right shoulder thereof, represents a pseudo inverse of the 3×4 matrix. For that reason, the relation between the right-hand side and the left-hand side in the equation (9) is expressed using '≈'. Hereinafter, at the time of use of pseudo inverse matrixes, all relations between right-hand sides and left-hand sides are expressed using '~'. An index i indicates a sampling timing. The reason why the elements on the third line are 0 is because the variation of each wheel load in the vertical direction does not contribute to a yaw rotary motion. In this regard, $J_{all}$, $\dot{R}_{(i)}$, and $N_{v(i)}$ do not influence the variation of each wheel load, so that $J_{all}$, $\dot{R}_{(i)}$, and $N_{v(i)}$ may be any suitable value. Each wheel load may be estimated based on the sum of a static load of the wheel load and the variation amount of the wheel load that is calculated by the equation (9).

Further, as a transformation of the equation (9), the variation amount of each wheel load and the yaw moment may be estimated as unknown parameters. In this case, the equation (9) is transformed as shown in the following equation (10).

[Formula 7]

$$\begin{bmatrix} \Delta FL_{Z(i)} \\ \Delta FR_{z(i)} \\ \Delta RL_{z(i)} \\ \Delta RR_{z(i)} \\ N_{v(i)} \end{bmatrix} \approx \begin{bmatrix} t_l & -t_r & t_l & -t_r & 0 \\ -l_f & -l_f & l_r & l_r & 0 \\ 0 & 0 & 0 & 0 & 1 \end{bmatrix}^+ \cdot$$

(10)

$$\left( J_{all} \cdot \begin{bmatrix} \dot{P}_{(i)} \\ \dot{Q}_{(i)} \\ \dot{R}_{(i)} \end{bmatrix} + \begin{bmatrix} 0 & -R_{(i)} & Q_{(i)} \\ R_{(i)} & 0 & -P_{(i)} \\ -Q_{(i)} & P_{(i)} & 0 \end{bmatrix} \cdot J_{all} \cdot \begin{bmatrix} P_{(i)} \\ Q_{(i)} \\ R_{(i)} \end{bmatrix} + \begin{bmatrix} -M_{all} \cdot G_{yall(i)} \cdot h_{R\_CG} \\ M_{all} \cdot G_{xall(i)} \cdot h_{CG} \\ 0 \end{bmatrix} \right)$$

Further, the total sum of the variation amounts of the respective wheel loads at each sampling timing i is 0, and therefore, a constraint in the following equation (11) is satisfied.

[Formula 8]

$$\Delta FL_Z + \Delta FR_Z + \Delta RL_Z + \Delta RR_Z = 0 \quad (11)$$

When the constraint in the equation (11) is added to the equation (10), the following equation (12) is satisfied, and the variation amounts of the respective wheel loads and the yaw moment may be calculated using the equation (12).

[Formula 9]

$$\begin{bmatrix} \Delta FL_{Z(i)} \\ \Delta FR_{z(i)} \\ \Delta RL_{z(i)} \\ \Delta RR_{z(i)} \\ N_{v(i)} \end{bmatrix} \approx \begin{bmatrix} t_l & -t_r & t_l & -t_r & 0 \\ -l_f & -l_f & l_r & l_r & 0 \\ 0 & 0 & 0 & 0 & 1 \\ 1 & 1 & 1 & 1 & 0 \end{bmatrix}^+ \cdot$$

(12)

$$\left( J_{all}^* \cdot \begin{bmatrix} \dot{P}_{(i)} \\ \dot{Q}_{(i)} \\ \dot{R}_{(i)} \\ 0 \end{bmatrix} + \begin{bmatrix} 0 & -R_{(i)} & Q_{(i)} & 0 \\ R_{(i)} & 0 & -P_{(i)} & 0 \\ -Q_{(i)} & P_{(i)} & 0 & 0 \\ 0 & 0 & 0 & 0 \end{bmatrix} \cdot J_{all}^* \cdot \begin{bmatrix} P_{(i)} \\ Q_{(i)} \\ R_{(i)} \\ 0 \end{bmatrix} + \begin{bmatrix} -M_{all} \cdot G_{yall(i)} \cdot h_{R\_CG} \\ M_{all} \cdot G_{xall(i)} \cdot h_{CG} \\ 0 \\ 0 \end{bmatrix} \right)$$

In the equation (12), $J_{all}^*$ is expressed by the following equation (13) transformed from the equation (4).

[Formula 10]

$$J_{all}^* = \begin{bmatrix} \sum_{j=1}^{N} m_j \cdot (\Delta y_j^2 + \Delta z_j^2) & -\sum_{j=1}^{N} m_j \cdot (\Delta x_j \cdot \Delta y_j) & -\sum_{j=1}^{N} m_j \cdot (\Delta x_j \cdot \Delta z_j) & 0 \\ -\sum_{j=1}^{N} m_j \cdot (\Delta x_j \cdot \Delta y_j) & \sum_{j=1}^{N} m_j \cdot (\Delta x_j^2 + \Delta z_j^2) & -\sum_{j=1}^{N} m_j \cdot (\Delta y_j \cdot \Delta z_j) & 0 \\ -\sum_{j=1}^{N} m_j \cdot (\Delta x_j \cdot \Delta z_j) & -\sum_{j=1}^{N} m_j \cdot (\Delta y_j \cdot \Delta z_j) & \sum_{j=1}^{N} m_j \cdot (\Delta x_j^2 + \Delta y_j^2) & 0 \\ 0 & 0 & 0 & 0 \end{bmatrix}$$ (13)

Furthermore, when roll rigidity distribution ratios $a_f$, $a_r$ based on vertical rigidities $k_f$, $k_r$ of the front and rear wheels are applied to the equation (12), the following equation (14) is satisfied.

[Formula 11]

$$\begin{bmatrix} \Delta FL_{Z(i)} \\ \Delta FR_{z(i)} \\ \Delta RL_{z(i)} \\ \Delta RR_{z(i)} \\ N_{v(i)} \end{bmatrix} = \begin{bmatrix} t_l & -t_r & t_l & -t_r & 0 \\ -l_f & -l_f & l_r & l_r & 0 \\ 0 & 0 & 0 & 0 & 1 \\ 1 & 1 & 1 & 1 & 0 \\ a_r & -a_r & -a_f & a_f & 0 \end{bmatrix}^{-1} \cdot$$

(14)

$$\left( J_{all2}^* \cdot \begin{bmatrix} \dot{P}_{(i)} \\ \dot{Q}_{(i)} \\ \dot{R}_{(i)} \\ 0 \\ 0 \end{bmatrix} + \begin{bmatrix} 0 & -R_{(i)} & Q_{(i)} & 0 & 0 \\ R_{(i)} & 0 & -P_{(i)} & 0 & 0 \\ -Q_{(i)} & P_{(i)} & 0 & 0 & 0 \\ 0 & 0 & 0 & 0 & 0 \\ 0 & 0 & 0 & 0 & 0 \end{bmatrix} \cdot J_{all2}^* \cdot \begin{bmatrix} P_{(i)} \\ Q_{(i)} \\ R_{(i)} \\ 0 \\ 0 \end{bmatrix} + \begin{bmatrix} -M_{all} \cdot G_{yall(i)} \cdot h_{R\_CG} \\ M_{all} \cdot G_{xall(i)} \cdot h_{CG} \\ 0 \\ 0 \\ 0 \end{bmatrix} \right)$$

In the equation (14), the first matrix on the right-hand side, which is the 5×5 matrix added "−1" on the right shoulder thereof, represents an inverse of the 5×5 matrix. Further, the roll rigidity distribution ratios $a_f$, $a_r$ in the equation (14) are calculated by the following equation (15) and equation (16).

[Formula 12]

$$a_f = \frac{k_f}{k_f + k_r} \quad (15)$$

$$a_r = \frac{k_r}{k_f + k_r} \quad (16)$$

Further, in the equation (14), $J_{all2}^*$ is expressed by the following equation (17) transformed from the equation (4).

[Formula 13]

$$J_{all2}^* = \begin{bmatrix} \sum_{j=1}^{N} m_j \cdot (\Delta y_j^2 + \Delta z_j^2) & -\sum_{j=1}^{N} m_j \cdot (\Delta x_j \cdot \Delta y_j) & -\sum_{j=1}^{N} m_j \cdot (\Delta x_j \cdot \Delta z_j) & 0 & 0 \\ -\sum_{j=1}^{N} m_j \cdot (\Delta x_j \cdot \Delta y_j) & \sum_{j=1}^{N} m_j \cdot (\Delta x_j^2 + \Delta z_j^2) & -\sum_{j=1}^{N} m_j \cdot (\Delta y_j \cdot \Delta z_j) & 0 & 0 \\ -\sum_{j=1}^{N} m_j \cdot (\Delta x_j \cdot \Delta z_j) & -\sum_{j=1}^{N} m_j \cdot (\Delta y_j \cdot \Delta z_j) & \sum_{j=1}^{N} m_j \cdot (\Delta x_j^2 + \Delta y_j^2) & 0 & 0 \\ 0 & 0 & 0 & 0 & 0 \\ 0 & 0 & 0 & 0 & 0 \end{bmatrix} \quad (17)$$

The following will describe a configuration of a wheel load estimation device according to the first embodiment.

Figure 4:
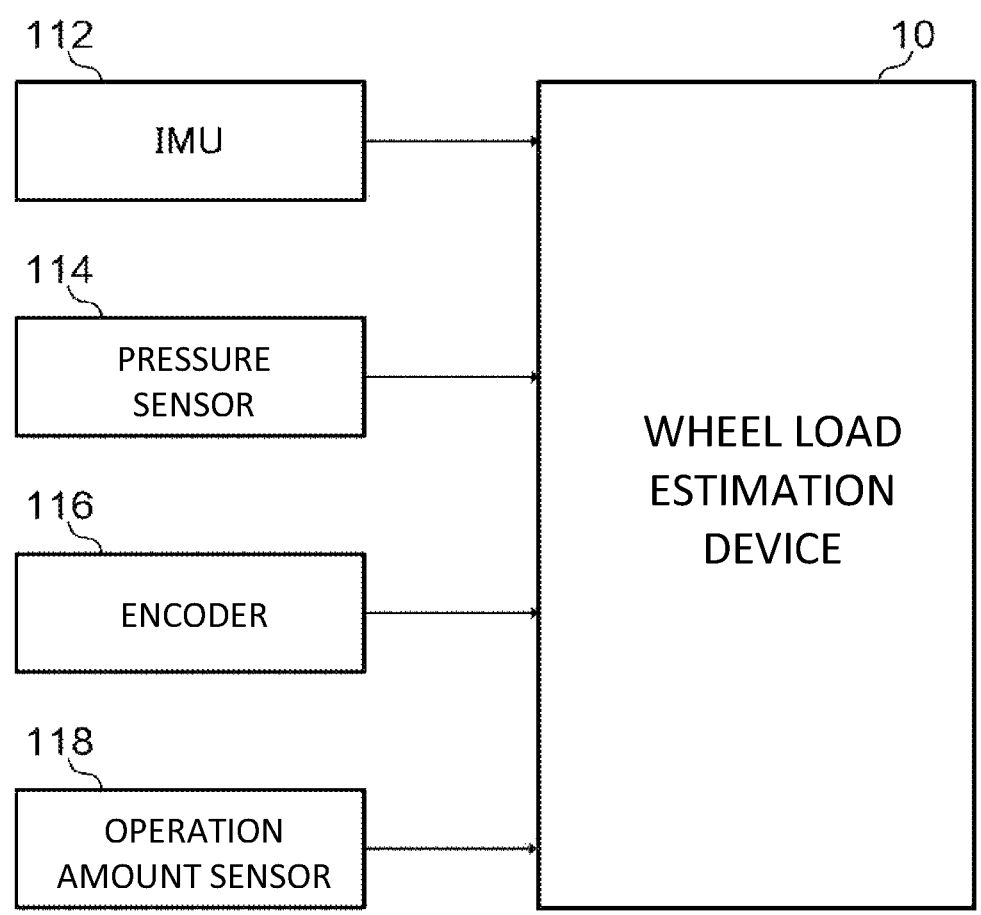
FIG. 4 is a block diagram illustrating a wheel load estimation device according to a first embodiment and respective constituent parts that are connected to the wheel load estimation device.

As illustrated in FIG. 4, the IMU 112, a pressure sensor 114, an encoder 116, and an operation amount sensor 118 are connected to a wheel load estimation device 10 according to the first embodiment. The wheel load estimation device 10 is installed at any suitable position in the vehicle (forklift).

The IMU 112, which is installed at any suitable position in the vehicle (forklift) as described above, detects the angular accelerations around the respective axes of the three axes of the vehicle coordinate system and the accelerations in the respective axis directions, and outputs detection values. The pressure sensor 114 is, for example, a sheet-shaped sensor provided on the whole surface of a loading surface of each fork 106 on which the loading object 104 is loaded. The pressure sensor 114 detects pressures that are applied to positions on the loading surface, and outputs detection values. The encoder 116 detects the rotation angle of a hydraulic lifting motor for moving the inner mast 110 up and down, and outputs a detection value. The operation amount sensor 118 detects each of an accelerator pedal stepping amount, a brake pedal stepping amount, and a steering angle, and outputs detection values.

Figure 5:
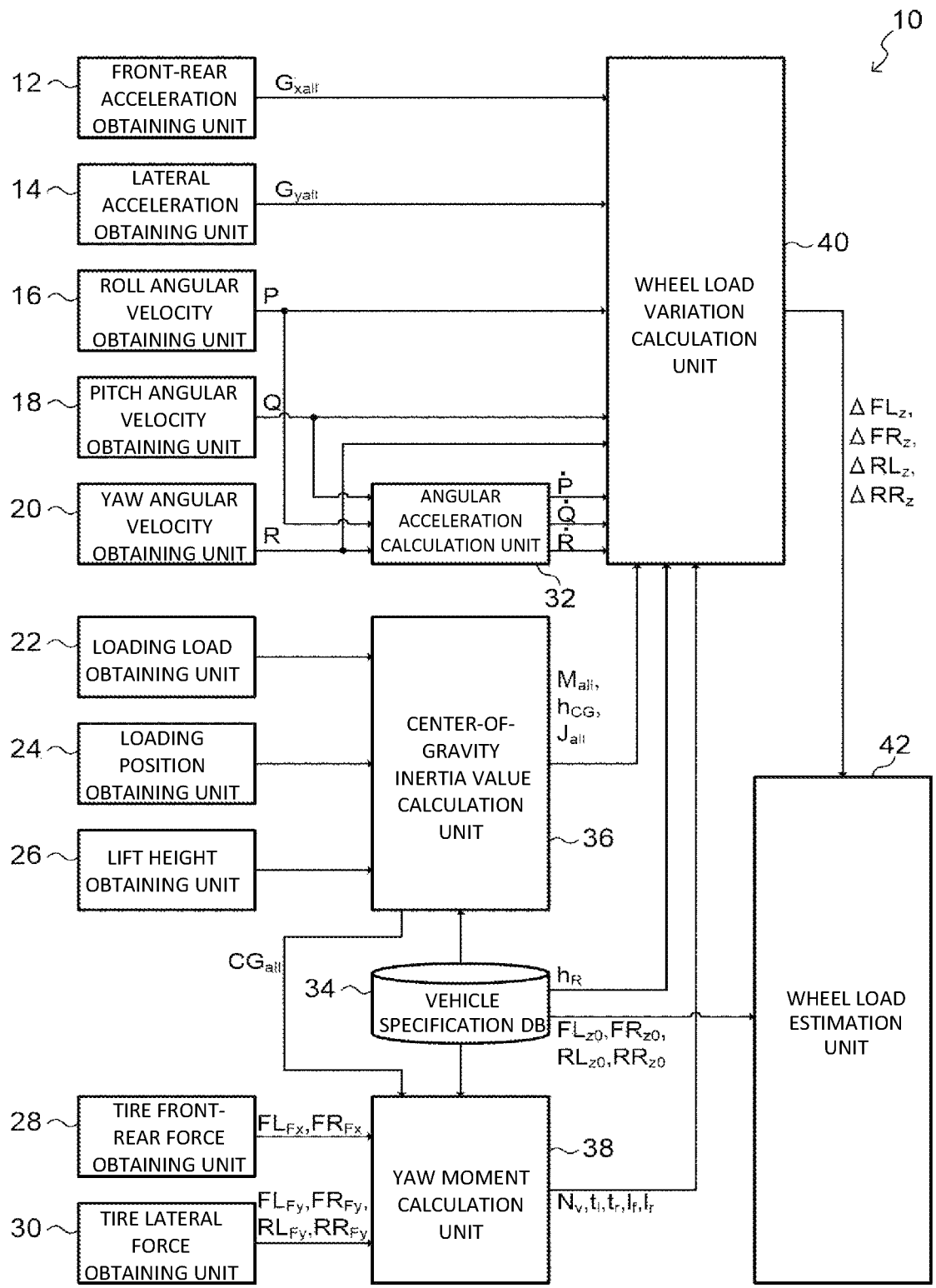
FIG. 5 is a functional block diagram of the wheel load estimation device according to the first embodiment.

As illustrated in FIG. 5, the wheel load estimation device 10 functionally includes a front-rear acceleration obtaining unit 12, a lateral acceleration obtaining unit 14, a roll angular velocity obtaining unit 16, a pitch angular velocity obtaining unit 18, and a yaw angular velocity obtaining unit 20. The wheel load estimation device 10 also includes a loading load obtaining unit 22, a loading position obtaining unit 24, a lift height obtaining unit 26, a tire front-rear force obtaining unit 28, and a tire lateral force obtaining unit 30. The wheel load estimation device 10 also includes an angular acceleration calculation unit 32, a vehicle specification DB (Database) 34, a center-of-gravity inertia value calculation unit 36, a yaw moment calculation unit 38, a wheel load variation calculation unit 40, and a wheel load estimation unit 42. The front-rear acceleration obtaining unit 12, the lateral acceleration obtaining unit 14, the roll angular velocity obtaining unit 16, the pitch angular velocity obtaining unit 18, the yaw angular velocity obtaining unit 20, the loading load obtaining unit 22, the loading position obtaining unit 24, the lift height obtaining unit 26, the tire front-rear force obtaining unit 28, the tire lateral force obtaining unit 30, and the angular acceleration calculation unit 32 constitute the obtaining unit in the present disclosure.

The front-rear acceleration obtaining unit 12 receives the detection values output from the IMU 112, and obtains, from the detection values, the acceleration $G_x$ in the x-axis direction as the front-rear acceleration $G_{xall}$ of the center of gravity $CG_{all}$ of the whole vehicle 100. Similarly, the lateral acceleration obtaining unit 14 receives the detection values output from the IMU 112, and obtains, from the detection values, the acceleration $G_y$ in the y-axis direction as the lateral acceleration $G_{yall}$ of the center of gravity $CG_{all}$ of the whole vehicle 100.

The roll angular velocity obtaining unit 16 receives the detection values output from the IMU 112, and obtains, from the detection values, the angular velocity around the x-axis as a roll angular velocity P. The pitch angular velocity obtaining unit 18 receives the detection values output from the IMU 112, and obtains, from the detection values, the angular velocity around the y-axis as a pitch angular velocity Q. The yaw angular velocity obtaining unit 20 receives the detection values output from the IMU 112, and obtains, from the detection values, the angular velocity around the z-axis as a yaw angular velocity R.

The loading load obtaining unit 22 receives the detection values output from the pressure sensor 114, and obtains the weight $M_\alpha$ of the loading object 104 loaded on the forks 106 by converting the detection values indicating the pressure into the weight. The loading position obtaining unit 24 receives the detection values output from the pressure sensor 114, and obtains a position where the highest detection value is detected on the loading surfaces of the forks 106, as the position of the loading object 104 loaded on the forks 106. The lift height obtaining unit 26 receives the detection value output from the encoder 116, calculates the height of the forks 106 with respect to a reference position (for example, the lowest portion) using the rotation angle of the hydraulic lifting motor indicated by the detection value, and obtains this height as the lift height.

The tire front-rear force obtaining unit 28 receives the detection values output from the operation amount sensor 118, and obtains the tire front-rear forces $FL_{Fx}$, $FR_{Fx}$ by inputting each of a breaking/driving force based on the accelerator pedal stepping amount and breaking pedal stepping amount indicated by the detection values and the steering angle, to a tire characteristic model defined in advance. Similarly, the tire lateral force obtaining unit 30 receives the detection values output from the operation amount sensor 118, and obtains the tire lateral forces $FL_{Fy}$, $FR_{Fy}$, $RL_{Fy}$, $RR_{Fy}$ by inputting the breaking/driving force based on the accelerator pedal stepping amount and breaking pedal stepping amount indicated by the detection values, the steering angle, the vehicle speed, the yaw rate, and the like, to tire characteristics defined in advance.

The angular acceleration calculation unit 32 calculates each of a roll angular acceleration $\dot{P}$, a pitch angular acceleration $\dot{Q}$, and a yaw angular acceleration $\dot{R}$ by performing the approximate differentiation, or the like of the roll angular velocity P, the pitch angular velocity Q, and the yaw angular velocity R that are respectively obtained by the roll angular velocity obtaining unit 16, the pitch angular velocity obtaining unit 18, and the yaw angular velocity obtaining unit 20 at each sampling timing.

The vehicle specification DB 34 stores a variety of data relevant to the vehicle. Specifically, information including the arrangement of the respective wheels and structures having the roll center $h_R$, a weight $M_\beta$, static loads $FL_{z0}$, $FR_{z0}$, $RL_{z0}$, $RR_{z0}$ on the respective wheels, the shapes of the respective constituent parts, a weight $m_j$, or the like, is stored.

The center-of-gravity inertia value calculation unit 36 calculates the weight $M_{all}$ of the whole vehicle 100 including the loading object 104 by adding the weight $M_\alpha$ of the loading object 104 obtained by the loading load obtaining unit 22 to the weight $M_\beta$ of the vehicle that is stored in the vehicle specification DB 34. Further, the center-of-gravity inertia value calculation unit 36 calculates the position 104A of the center of gravity of the loading object based on the information obtained by each of the loading load obtaining unit 22, the loading position obtaining unit 24, and the lift height obtaining unit 26. As the calculation method of the position 104A of the center of gravity of the loading object, for example, a method described in Japanese Patent Application Publication No. 2020-093741 may be employed.

Further, the center-of-gravity inertia value calculation unit 36 calculates the position 100A of the center of gravity $CG_{all}$ of the whole vehicle 100 and the positions 102A, 106A, 108A, 110A of the centers of gravity of the constituent parts j based on the position 104A of the center of gravity of the loading object and the structures of the respective constituent parts stored in the vehicle specification DB 34. Then, by the equations (5), the center-of-gravity inertia value calculation unit 36 calculates the differences ($\Delta x_j$, $\Delta y_j$, and $\Delta z_j$) in the respective axis directions between the position 100A of the center of gravity $CG_{all}$ of the whole vehicle 100 and the positions 102A, 104A, 106A, 108A, 110A of the centers of gravity of the constituent parts j. Further, by the equation (4), the center-of-gravity inertia value calculation unit 36 calculates the inertial tensor $J_{all}$ using the calculated $\Delta x_j$, $\Delta y_j$, and $\Delta z_j$ and the weights $m_j$ of the constituent parts j stored in the vehicle specification DB 34.

The center-of-gravity inertia value calculation unit 36 determines the z-axis directional position ($z_{all}$) of the calculated position 100A of the center of gravity $CG_{all}$ of the whole vehicle 100 as $h_{CG}$.

Consequently, the center-of-gravity inertia value calculation unit 36 calculates the information ($M_{all}$, the position 100A of $CG_{all}$, the positions 102A, 106A, 108A, 110A of the centers of gravity of the constituent parts j, the position 104A of the center of gravity of the loading object, the differences ($\Delta x_j$, $\Delta y_j$, and $\Delta z_j$) in the respective axis directions between the position 100A of the center of gravity $CG_{all}$ of the whole vehicle 100 and the positions 102A, 104A, 106A, 108A, 110A of the centers of gravity of the constituent parts j, and $h_{CG}$) relevant to the center of gravity, and calculates the inertia tensor $J_{all}$ that represents the inertia value including the inertial principal axis around the center of gravity of the rigid body.

The yaw moment calculation unit 38 calculates the respective y-directional distances $t_l$ and $t_r$ from $CG_{all}$ to the right and left wheels and the respective x-directional distances $l_f$ and $l_r$ from $CG_{all}$ to the front and rear wheels based on the position 100A of the center of gravity $CG_{all}$ of the whole vehicle 100 calculated by the center-of-gravity inertia value calculation unit 36 and the information about the arrangement of the respective wheels stored in the vehicle specification DB 34. Then, by the equation (8), the yaw moment calculation unit 38 calculates the yaw moment $N_v$ around the center of gravity $CG_{all}$ of the whole vehicle 100 using the calculated $t_l$, $t_r$, $l_f$, and $l_r$, the tire front-rear forces $FL_{Fx}$, $FR_{Fx}$ obtained by the tire front-rear force obtaining unit 28, and the tire lateral forces $FL_{Fy}$, $FR_{Fy}$, $RL_{Fy}$, $RR_{Fy}$ obtained by the tire lateral force obtaining unit 30.

The wheel load variation calculation unit 40 calculates the z-directional distance $h_{R\_CG}$ between $CG_{all}$ and the roll center $h_R$ from $h_{CG}$ calculated by the center-of-gravity inertia value calculation unit 36 and the roll center $h_R$ stored in the vehicle specification DB 34. Then, by the equation (9), the wheel load variation calculation unit 40 calculates the variation amounts $\Delta FL_z$, $\Delta FR_z$, $\Delta RL_z$, and $\Delta RR_z$ of the respective wheel loads using the front-rear acceleration $G_{xall}$ obtained by the front-rear acceleration obtaining unit 12, the lateral acceleration $G_{yall}$ obtained by the lateral acceleration obtaining unit 14, the roll angular velocity P obtained by the roll angular velocity obtaining unit 16, the pitch angular velocity Q obtained by the pitch angular velocity obtaining unit 18, the yaw angular velocity R obtained by the yaw angular velocity obtaining unit 20, the roll angular acceleration $\dot{P}$, the pitch angular acceleration $\dot{Q}$, and the yaw angular acceleration $\dot{R}$ calculated by the angular acceleration calculation unit 32, the weight $M_{all}$ of the whole vehicle 100 calculated by the center-of-gravity inertia value calculation unit 36, the inertia tensor $J_{all}$, the z-directional position $h_{CG}$ of $CG_{all}$, the calculated z-directional distance $h_{R\_CG}$ between $CG_{all}$ and the roll center $h_R$, the yaw moment $N_v$ calculated by the yaw moment calculation unit 38, and the x or y-directional distances $t_l$, $t_r$, $l_f$, $l_r$ from $CG_{all}$ to the respective wheels.

The wheel load estimation unit 42 estimates the respective wheel loads $FL_z$, $FR_z$, $RL_z$, and $RR_z$ from the sum of the variation amounts $\Delta FL_z$, $\Delta FR_z$, $\Delta RL_z$, and $\Delta RR_z$ of the respective wheel loads calculated by the wheel load variation calculation unit 40 and the static loads $FL_{z0}$, $FR_{z0}$, $RL_{z0}$, $RR_{z0}$ on the respective wheels stored in the vehicle specification DB 34, and outputs an estimation result.

Figure 6:
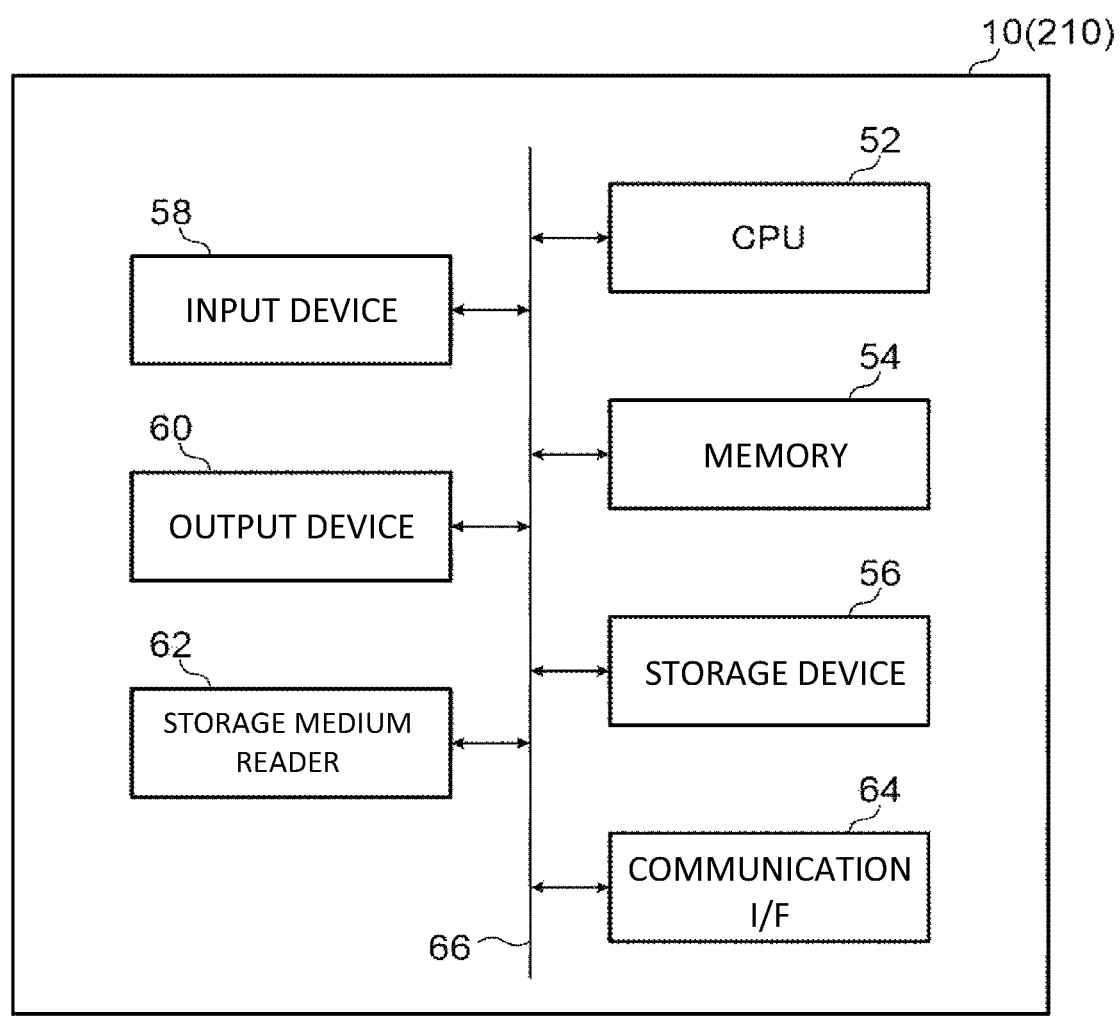
FIG. 6 is a block diagram illustrating a hardware configuration of the wheel load estimation device.

FIG. 6 is a block diagram illustrating the hardware configuration of the wheel load estimation device 10 according to the first embodiment. As illustrated in FIG. 6, the wheel load estimation device 10 includes a CPU (Central Processing Unit) 52, a memory 54, a storage device 56, an input device 58, an output device 60, a storage medium reader 62, and a communication I/F (Interface) 64. The respective constituent parts are connected through a bus 66 in a mutually communicable manner.

The storage device 56 stores a wheel load estimation program for executing a wheel load estimation process. The CPU 52, which is a central arithmetic processing unit, executes a variety of programs and controls the respective constituent parts. That is, the CPU 52 reads programs from the storage device 56 and executes programs using the memory 54 as a working area. The CPU 52 performs the control of the above respective constituent parts and a variety of arithmetic processes in accordance with the programs stored in the storage device 56.

The memory 54 is constituted by a RAM (Random Access Memory) and temporarily stores programs and data as a working area. The storage device 56 is constituted by a ROM (Read Only Memory), an HDD (Hard Disk Drive), an SSD (Solid State Drive), and the like, and contains a variety of data and a variety of programs including an operating system.

The input device 58 is a device such as a keyboard or a mouse for inputting a variety of information. The output device 60 is a device such as a display or a printer for outputting a variety of information. The output device 60 may function as the input device 58 by employing a touch panel display. The storage medium reader 62 reads data stored in a variety of storage media such as a CD (Compact Disc)-ROM, a DVD (Digital Versatile Disc)-ROM, a Blu-ray disc, or a USB (Universal Serial Bus) memory, the writing of data to such a storage media, and the like.

The communication I/F 64 is an interface for communicating with other apparatuses. For example, a standard such as Ethernet (registered trademark), FDDI or Wi-Fi (registered trademark) is used for the communication I/F 64.

Figure 7:
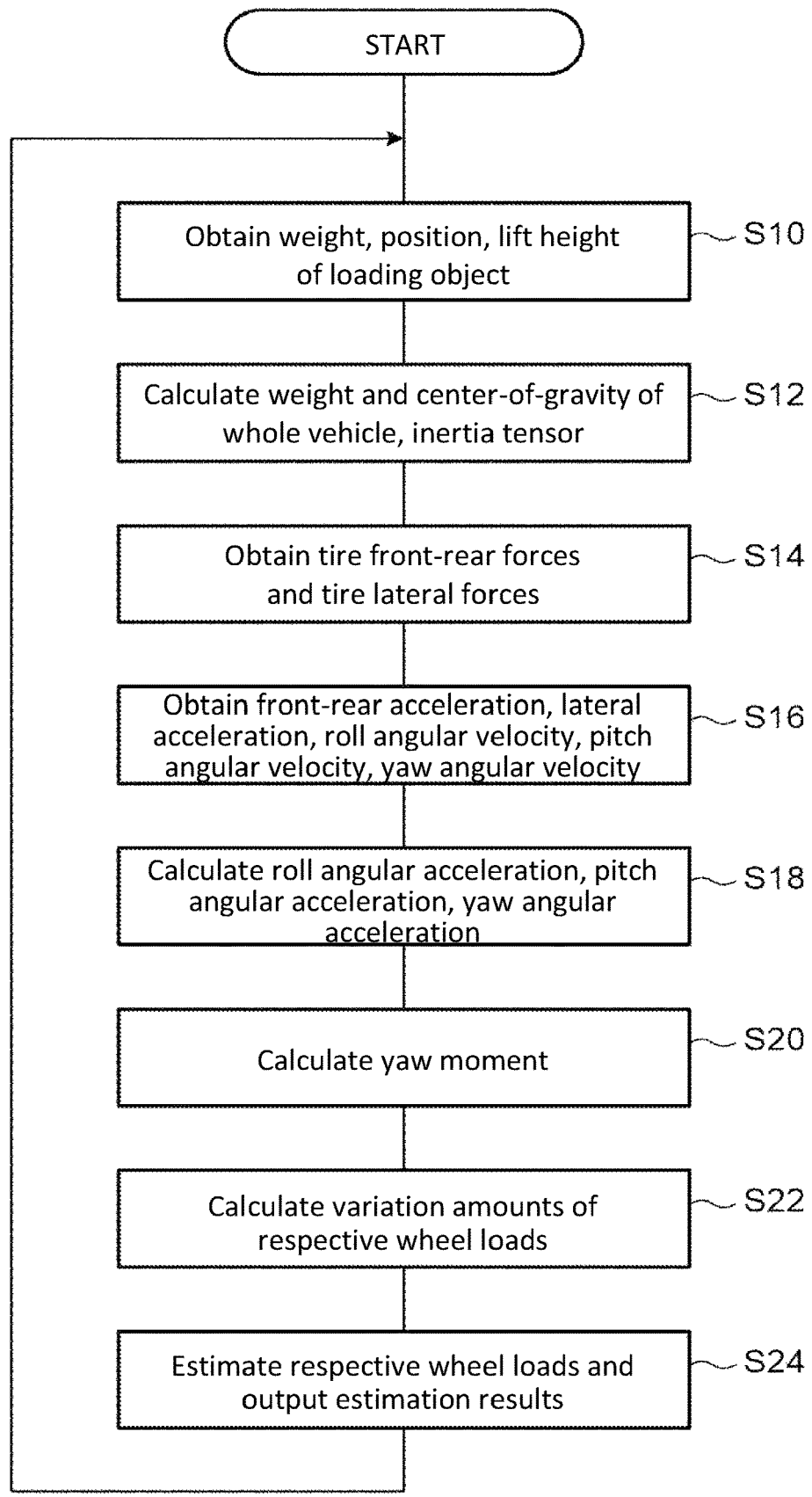
FIG. 7 is a flowchart illustrating an example of a wheel load estimation process in the first embodiment.

The following will describe an operation of the wheel load estimation device 10 according to the first embodiment. When the forklift starts to travel, the wheel load estimation device 10 executes the wheel load estimation process illustrated in FIG. 7.

In Step S10, the loading load obtaining unit 22 obtains the weight $M_\alpha$ of the loading object 104 loaded on the forks 106 from the detection values of the pressure sensor 114, the loading position obtaining unit 24 obtains the position of the loading object 104 from the detection values of the pressure sensor 114, and the lift height obtaining unit 26 obtains the lift height from the detection value of the encoder 116.

Next, in Step S12, the center-of-gravity inertia value calculation unit 36 calculates the weight $M_{all}$ of the whole vehicle 100, the position 100A of the center of gravity $CG_{all}$, and the positions 102A, 104A, 106A, 108A, 110A of the centers of gravity of the constituent parts j based on the information obtained in the above Step S10 and the information stored in the vehicle specification DB 34, and calculates the inertia tensor $J_{all}$ by the equation (4).

Next, in Step S14, the tire front-rear force obtaining unit 28 obtains the tire front-rear forces $FL_{Fx}$, $FR_{Fx}$ and the tire lateral force obtaining unit 30 obtains the tire lateral forces $FL_{Fy}$, $FR_{Fy}$, $RL_{Fy}$, $RR_{Fy}$, based on the detection values of the operation amount sensor 118 and the tire characteristic model defined in advance.

Next, in Step S16, the front-rear acceleration obtaining unit 12, the lateral acceleration obtaining unit 14, the roll angular velocity obtaining unit 16, the pitch angular velocity obtaining unit 18, and the yaw angular velocity obtaining unit 20 respectively obtain the front-rear acceleration $G_{xall}$, the lateral acceleration $G_{yall}$, the roll angular velocity P, the pitch angular velocity Q, and the yaw angular velocity R, from the detection values of the IMU 112.

Next, in Step S18, the angular acceleration calculation unit 32 calculates each of the roll angular acceleration $\dot{P}$, the pitch angular acceleration $\dot{Q}$, and the yaw angular acceleration $\dot{R}$, by performing the approximate differentiation, or the like of each of the roll angular velocity P, the pitch angular velocity Q, and the yaw angular velocity R obtained in the above-described Step S16.

Next, in Step S20, the yaw moment calculation unit 38 calculates the respective y-directional distances $t_l$ and $t_r$ from $CG_{all}$ to the right and left wheels and the respective x-directional distances $l_f$ and $l_r$ from $CG_{all}$ to the front and rear wheels. Then, by the equation (8), the yaw moment calculation unit 38 calculates the yaw moment $N_y$ using the calculated $t_l$, $t_r$, $l_f$ and $l_r$ and the tire front-rear forces $FL_{Fx}$, $FR_{Fx}$ and tire lateral forces $FL_{Fy}$, $FR_{Fy}$, $RL_{Fy}$, $RR_{Fy}$ obtained in the above-described Step S14.

Next, in Step S22, by the equation (9), the wheel load variation calculation unit 40 calculates the variation amounts $\Delta FL_z$, $\Delta FR_z$, $\Delta RL_z$, and $\Delta RR_z$ of the respective wheel loads using $G_{xall}$, $G_{yall}$, P, Q, R, $\dot{P}$, $\dot{Q}$, $\dot{R}$, $M_{all}$, $J_{all}$, $h_{CG}$, $h_{R\_CG}$, $N_y$, $t_l$, $t_r$, $l_f$, and $l_r$ obtained or calculated in the above-described Steps S12 to S20.

Next, in Step S24, the wheel load estimation unit 42 estimates the respective wheel loads from the sum of the variation amounts $\Delta FL_z$, $\Delta FR_z$, $\Delta RL_z$, and $\Delta RR_z$ of the respective wheel loads calculated in the above-described Step S22 and the static loads $FL_{z0}$, $FR_{z0}$, $RL_{z0}$, $RR_{z0}$ on the respective wheels stored in the vehicle specification DB 34, and outputs the estimation result. Then, the process returns to Step S10. While the forklift is travelling, the processes in Steps S10 to S24 are repeatedly executed. The output estimation result of the wheel load is used for the control of preventing the overturn of the forklift, or the like.

As described above, with the wheel load estimation device according to the first embodiment, the wheel loads are accurately estimated by setting the inertial principal axis and the inertial products according to the loading state of the loading object and estimating the respective wheel loads. Further, since the wheel loads are estimated only by mounting a light sensor such as the IMU, it is not necessary to perform a general load measurement using a strain gauge, a load cell, or the like. Accordingly, the wheel loads are estimated without decreasing the rigidity of a portion of each fork, so that it is possible to avoid the risk of decreasing the rigidity of the portion of the fork.

With the wheel load estimation device according to the first embodiment, the yaw moment in addition to the respective wheel loads may be calculated using the constraint that the total sum of the variation amounts of the respective wheel loads is 0. The estimated yaw moment may be used for the control of torque vectoring.

Second Embodiment

The following will describe a second embodiment. Firstly, a principle of the second embodiment will be described. In the second embodiment, a case where the respective wheel loads of a three-wheel forklift having two front wheels and one rear wheel are estimated will be described. Further, the premise condition is the same as that in the first embodiment.

In the three-wheel forklift, based on the fact that the rear wheel is disposed at the midpoint of a rear axle to contribute to only the pitch behavior without contributing to the roll behavior, the equation (9) in the first embodiment is rewritten as shown in the following equation (18).

[Formula 14]

$$\begin{bmatrix} \Delta FL_{z(i)} \\ \Delta FR_{z(i)} \\ \Delta R_{z(i)} \end{bmatrix} = \begin{bmatrix} t_l & -t_r & 0 \\ -l_f & -l_f & l_r \\ 0 & 0 & 0 \end{bmatrix}^{-1} \cdot \left( J_{all} \cdot \begin{bmatrix} \dot{P}_{(i)} \\ \dot{Q}_{(i)} \\ \dot{R}_{(i)} \end{bmatrix} + \begin{bmatrix} 0 & -R_{(i)} & Q_{(i)} \\ R_{(i)} & 0 & -P_{(i)} \\ -Q_{(i)} & P_{(i)} & 0 \end{bmatrix} \cdot J_{all} \cdot \begin{bmatrix} P_{(i)} \\ Q_{(i)} \\ R_{(i)} \end{bmatrix} + \begin{bmatrix} -M_{all} \cdot G_{yall(i)} \cdot h_{R\_CG} \\ M_{all} \cdot G_{xall(i)} \cdot h_{CG} \\ N_{y(i)} \end{bmatrix} \right) \quad (18)$$

When the equation (10) and the equation (12) in the first embodiment are rewritten similarly to the equation (9), the following equation (19) and equation (20) are obtained.

[Formula 15]

$$\begin{pmatrix} \begin{bmatrix} \Delta FL_{Z(i)} \\ \Delta FR_{z(i)} \\ \Delta R_{z(i)} \\ N_{v(i)} \end{bmatrix} \approx \begin{bmatrix} t_l & -t_r & 0 & 0 \\ -l_f & -l_f & l_r & 0 \\ 0 & 0 & 0 & 1 \end{bmatrix}^+ \end{pmatrix} \quad (19)$$

$$\begin{pmatrix} J_{all} \cdot \begin{bmatrix} \dot{P}_{(i)} \\ \dot{Q}_{(i)} \\ \dot{R}_{(i)} \end{bmatrix} + \begin{bmatrix} 0 & -R_{(i)} & Q_{(i)} \\ R_{(i)} & 0 & -P_{(i)} \\ -Q_{(i)} & P_{(i)} & 0 \end{bmatrix} \cdot J_{all} \cdot \begin{bmatrix} P_{(i)} \\ Q_{(i)} \\ R_{(i)} \end{bmatrix} + \begin{bmatrix} -M_{all} \cdot G_{yall(i)} \cdot h_{R\_CG} \\ M_{all} \cdot G_{xall(i)} \cdot h_{CG} \\ 0 \end{bmatrix} \end{pmatrix}$$

$$\begin{bmatrix} \Delta FL_{Z(i)} \\ \Delta FR_{z(i)} \\ \Delta R_{z(i)} \\ N_{v(i)} \end{bmatrix} = \begin{bmatrix} t_l & -t_r & 0 & 0 \\ -l_f & -l_f & l_r & 0 \\ 0 & 0 & 0 & 1 \\ 1 & 1 & 1 & 0 \end{bmatrix}^+ \quad (20)$$

$$\begin{pmatrix} J_{all}^* \cdot \begin{bmatrix} \dot{P}_{(i)} \\ \dot{Q}_{(i)} \\ \dot{R}_{(i)} \\ 0 \end{bmatrix} + \begin{bmatrix} 0 & -R_{(i)} & Q_{(i)} & 0 \\ R_{(i)} & 0 & -P_{(i)} & 0 \\ -Q_{(i)} & P_{(i)} & 0 & 0 \\ 0 & 0 & 0 & 0 \end{bmatrix} \cdot J_{all}^* \cdot \begin{bmatrix} P_{(i)} \\ Q_{(i)} \\ R_{(i)} \\ 0 \end{bmatrix} + \begin{bmatrix} -M_{all} \cdot G_{yall(i)} \cdot h_{R\_CG} \\ M_{all} \cdot G_{xall(i)} \cdot h_{CG} \\ 0 \\ 0 \end{bmatrix} \end{pmatrix}$$

As described above, also in the case of the three-wheel forklift, it is possible to estimate the respective wheel loads, similarly to the case of the four-wheel forklift described in the first embodiment.

The following will describe the configuration of a wheel load estimation device according to the second embodiment. In the wheel load estimation device according to the second embodiment, the same constituent parts as those of the wheel load estimation device 10 according to the first embodiment are denoted by the same reference characters, and detailed descriptions are omitted.

Figure 8:
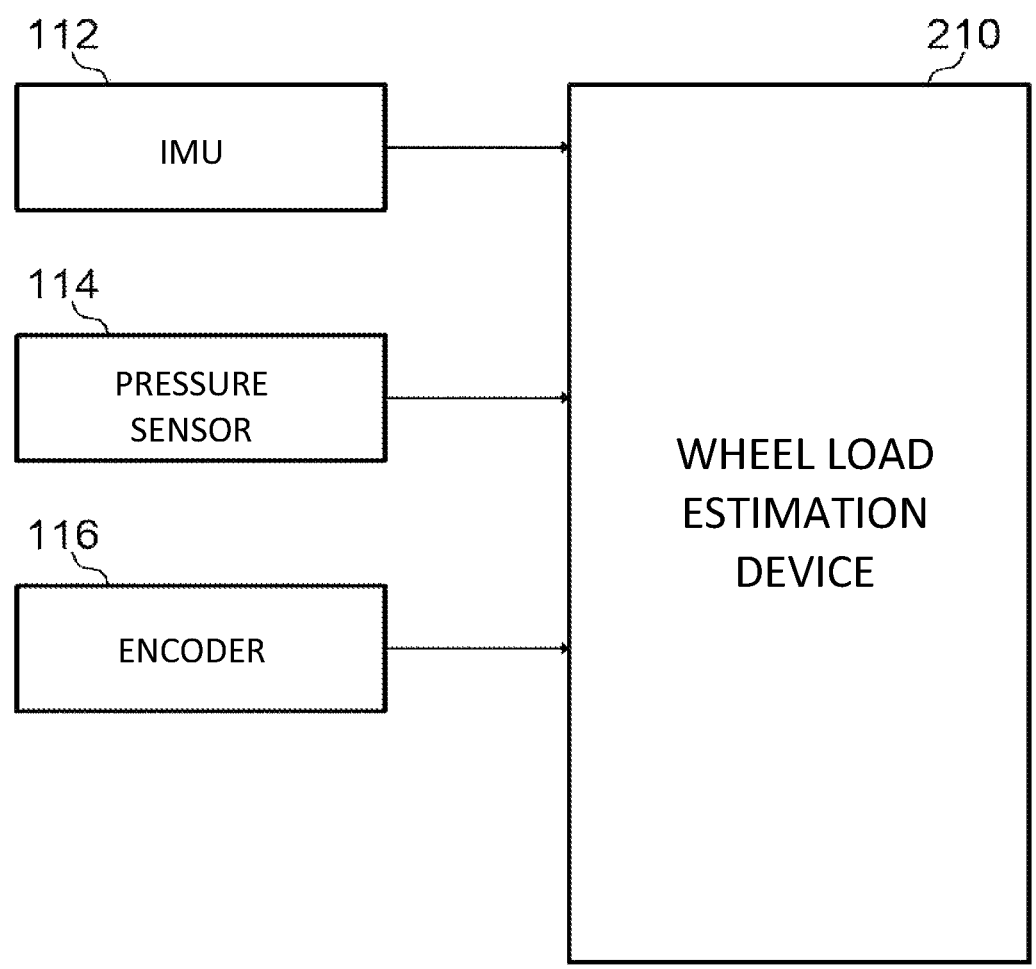
FIG. 8 is a block diagram illustrating a wheel load estimation device according to a second embodiment and respective constituent parts that are connected to the wheel load estimation device.

As illustrated in FIG. 8, the IMU 112, the pressure sensor 114, and the encoder 116 are connected to a wheel load estimation device 210 according to the second embodiment. The wheel load estimation device 210 is installed at any suitable position in the vehicle (forklift).

Figure 9:
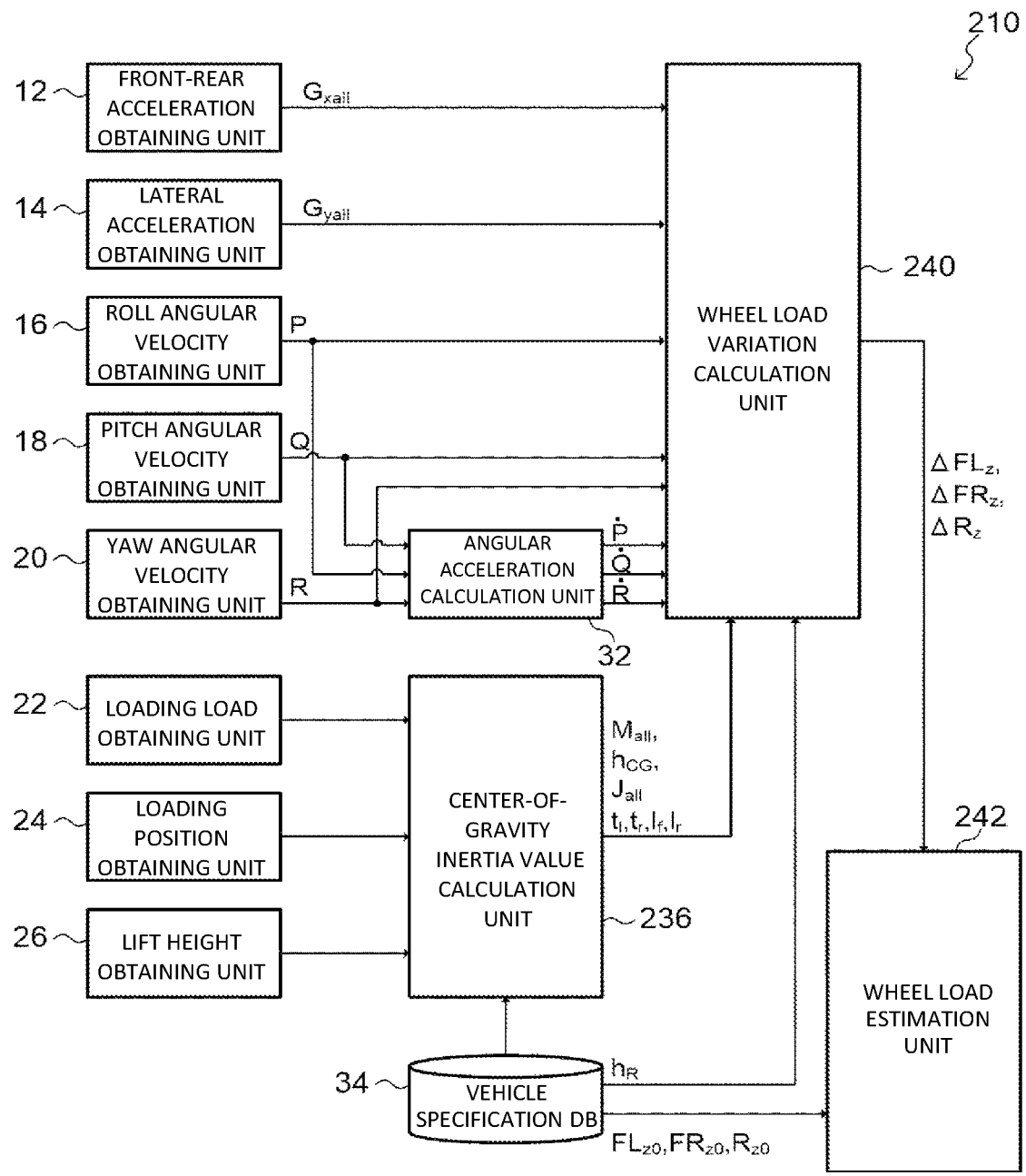
FIG. 9 is a functional block diagram of the wheel load estimation device according to the second embodiment.

As illustrated in FIG. 9, the wheel load estimation device 210 functionally includes the front-rear acceleration obtaining unit 12, the lateral acceleration obtaining unit 14, the roll angular velocity obtaining unit 16, the pitch angular velocity obtaining unit 18, and the yaw angular velocity obtaining unit 20. The wheel load estimation device 210 also includes the loading load obtaining unit 22, the loading position obtaining unit 24, and the lift height obtaining unit 26. The wheel load estimation device 210 also includes the angular acceleration calculation unit 32, the vehicle specification DB 34, a center-of-gravity inertia value calculation unit 236, a wheel load variation calculation unit 240, and a wheel load estimation unit 242.

The center-of-gravity inertia value calculation unit 236 calculates the weight $M_{all}$ of the whole vehicle 100 including the loading object 104, the inertia tensor $J_{all}$, and the z-axis directional position $h_{CG}$ of the center of gravity $CG_{all}$ of the whole vehicle 100, similarly to the center-of-gravity inertia value calculation unit 36 in the first embodiment.

Furthermore, the center-of-gravity inertia value calculation unit 236 calculates the respective y-directional distances $t_l$ and $t_r$ from $CG_{all}$ to the front right and front left wheels and the respective x-directional distances $l_f$ and $l_r$ from $CG_{all}$ to the front and rear wheels, based on the position 100A of the center of gravity $CG_{all}$ of the whole vehicle 100 and the information about the arrangement of the respective wheels stored in the vehicle specification DB 34. That is, the center-of-gravity inertia value calculation unit 236 calculates the information ($M_{all}$, the position 100A of $CG_{all}$, the positions 102A, 106A, 108A, 110A of the centers of gravity of the constituent parts j, the position 104A of the center of gravity of the loading object, the differences ($\Delta x_j$, $\Delta y_j$, and $\Delta z_j$) in the respective axis directions between the position 100A of the center of gravity $CG_{all}$ of the whole vehicle 100 and the positions 102A, 104A, 106A, 108A, 110A of the centers of gravity of the constituent parts j, $h_{CG}$, the respective y-directional distances $t_l$ and $t_r$ from $CG_{all}$ to the front right and front left wheels, and the respective x-directional distances $l_f$ and $l_r$ from $CG_{all}$ to the front and rear wheels) relevant to the center of gravity, and calculates the inertia tensor $J_{all}$ that represents the inertia value including the inertial principal axis around the center of gravity of the rigid body.

The wheel load variation calculation unit 240 calculates the z-directional distance $h_{R\_CG}$ between $CG_{all}$ and the roll center $h_R$, similarly to the wheel load variation calculation unit 40 in the first embodiment. Then, by the equation (20), the wheel load variation calculation unit 240 calculates the variation amounts $\Delta FL_z$, $\Delta FR_z$, and $\Delta R_z$ of the respective wheel loads and the yaw moment $N_v$ around the center of gravity $CG_{all}$ of the whole vehicle 100 using the front-rear acceleration $G_{xall}$, the lateral acceleration $G_{yall}$, the roll angular velocity P, the pitch angular velocity Q, the yaw angular velocity R, the roll angular acceleration $\dot{P}$, the pitch angular acceleration $\dot{Q}$, the yaw angular acceleration $\dot{R}$, the weight $M_{all}$ of the whole vehicle 100, the inertia tensor $J_{all}$, the z-axis directional position $h_{CG}$ of $CG_{all}$, the calculated z-directional distance $h_{R\_CG}$ between $CG_{all}$ and the roll center $h_R$, and the x or y-directional distances $t_l$, $t_r$, $l_f$, $l_r$ from $CG_{all}$ to the respective wheels.

The wheel load estimation unit 242 estimates the respective wheel loads $FL_z$, $FR_z$, and $R_z$, from the sum of the variation amounts $\Delta FL_z$, $\Delta FR_z$, and $\Delta R_z$ of the respective wheel loads calculated by the wheel load variation calculation unit 240 and the static loads $FL_{z0}$, $FR_{z0}$, and $R_{z0}$ on the respective wheels stored in the vehicle specification DB 34. Then, the wheel load estimation unit 242 outputs the respective estimated wheel loads and the yaw moment $N_v$ calculated by the wheel load variation calculation unit 240 as estimation results.

The hardware configuration of the wheel load estimation device 210 according to the second embodiment is the same as the hardware configuration of the wheel load estimation device 10 according to the first embodiment illustrated in FIG. 6, and therefore descriptions are omitted.

Figure 10:
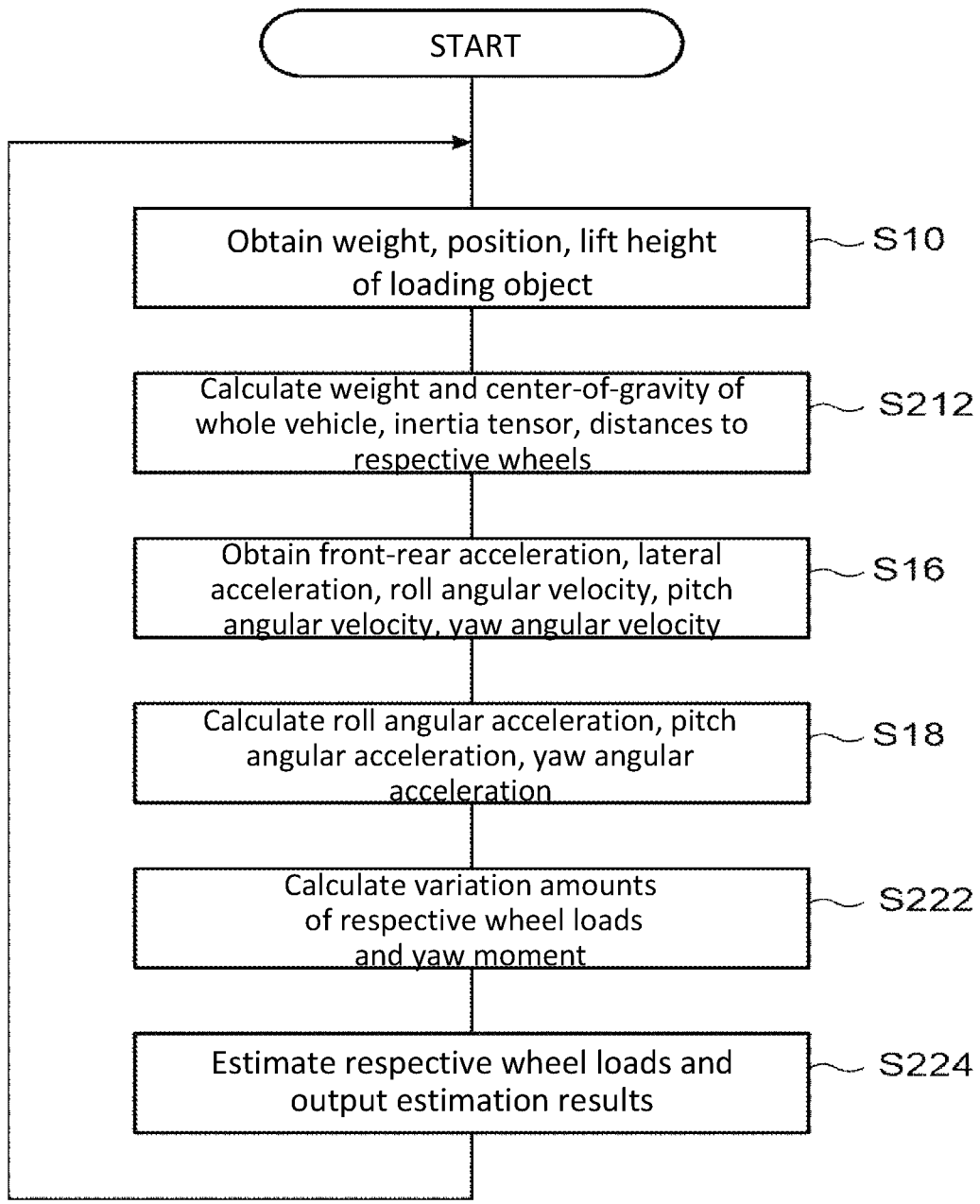
FIG. 10 is a flowchart illustrating an example of a wheel load estimation process in the second embodiment.

The following will describe an operation of the wheel load estimation device 210 according to the second embodiment. When the forklift starts to travel, a wheel load estimation process illustrated in FIG. 10 is executed in the wheel load estimation device 210. In the wheel load estimation process in the second embodiment, the same processes as those of the wheel load estimation process in the first embodiment are denoted by the same step reference numerals, and detailed descriptions are omitted.

After Step S10, in the next Step S212, the center-of-gravity inertia value calculation unit 236 calculates the weight $M_{all}$ of the whole vehicle 100 including the loading object 104, the inertia tensor $J_{all}$, the z-axis directional position $h_{CG}$ of the center of gravity $CG_{all}$ of the whole vehicle 100, the respective y-directional distances $t_l$ and $t_r$ from $CG_{all}$ to the front right and front left wheels, and the respective x-directional distances $l_f$ and $l_r$ from $CG_{all}$ to the front and rear wheels.

Next, after Steps S16 and S18, in the next Step S222, by the equation (20), the wheel load variation calculation unit 240 calculates the variation amounts $\Delta FL_z$, $\Delta FR_z$, and $\Delta R_z$ of the respective wheel loads and the yaw moment $N_v$ using $G_{xall}$, $G_{yall}$, P, Q, R, $\dot{P}$, $\dot{Q}$, $\dot{R}$, $M_{all}$, $J_{all}$, $h_{CG}$, $h_{R\_CG}$, $t_l$, $t_r$, $l_f$, $l_r$ obtained or calculated in the above-described Steps S212 to S18.

Next, in Step S224, the wheel load estimation unit 242 estimates the respective wheel loads from the sum of the variation amounts $\Delta FL_z$, $\Delta FR_z$, and $\Delta R_z$ of the respective wheel loads calculated in the above-described Step S222 and the static loads $FL_{z0}$, $FR_{z0}$, and $R_{z0}$, and outputs the respective wheel loads as estimation results, together with the yaw moment $N_v$ calculated in the above-described Step S222. Then, the process returns to Step S10. While the forklift is travelling, the processes in Steps S10 to S224 are repeatedly executed. Similarly to the first embodiment, the output estimation result of the wheel loads is used for the control of preventing the overturn of the forklift, or the like, and the output yaw moment is used for the control of torque vectoring, or the like.

As described above, the wheel load estimation device according to the second embodiment provides the same advantageous effects as those in the first embodiment, also for the three-wheel forklift.

In the second embodiment, similarly to the first embodiment, the tire front-rear force obtaining unit 28, the tire lateral force obtaining unit 30, and the yaw moment calculation unit 38 may be provided in order to calculate the yaw moment. In this case, the variation amounts of the respective wheel loads may be calculated using the equation (18). Further, in the first embodiment, similarly to the second embodiment, the tire front-rear force obtaining unit 28, the tire lateral force obtaining unit 30, and the yaw moment calculation unit 38 may be excluded, and in the wheel load variation calculation unit 40, the yaw moment may be calculated together with the variation amounts of the respective wheel loads using the equation (12) under the constraint of the equation (11), which expresses that the total sum of the variation amounts of the wheel loads about the respective wheels is 0.

In the above-described embodiments, the case where the lift height is obtained from the rotation angle of the hydraulic lifting motor detected by the encoder 116 has been described, but the present disclosure is not limited to this case. For example, the forks may have a wire, and the lift height may be obtained by measuring the change in the length of the wire at the time of lifting. Further, the other values to be obtained by the respective obtaining units are also not limited to the case where the other values are obtained by the methods described in the above-described embodiments, and may be obtained by other methods.

In the above embodiments, the case where the wheel load estimation device is mounted in the forklift has been described. However, the present disclosure is not limited to this case, and the wheel load estimation device may be configured as an external device. In this case, the forklift include a communication unit that sends, to the wheel load estimation device, the respective detection values of the IMU 112, the pressure sensor 114, the encoder 116, and the operation amount sensor 118, and the wheel load estimation device configured as the external device may obtain a variety of information sent from the communication unit of the forklift, and may estimate the wheel loads by the same process as those in the above embodiments.

In the above embodiments, the case where the vehicle is a forklift has been described, but the present disclosure may be applied to any vehicle that travels while the loading object is loaded in various states, for example, to a truck, or the like.

Figure 11:
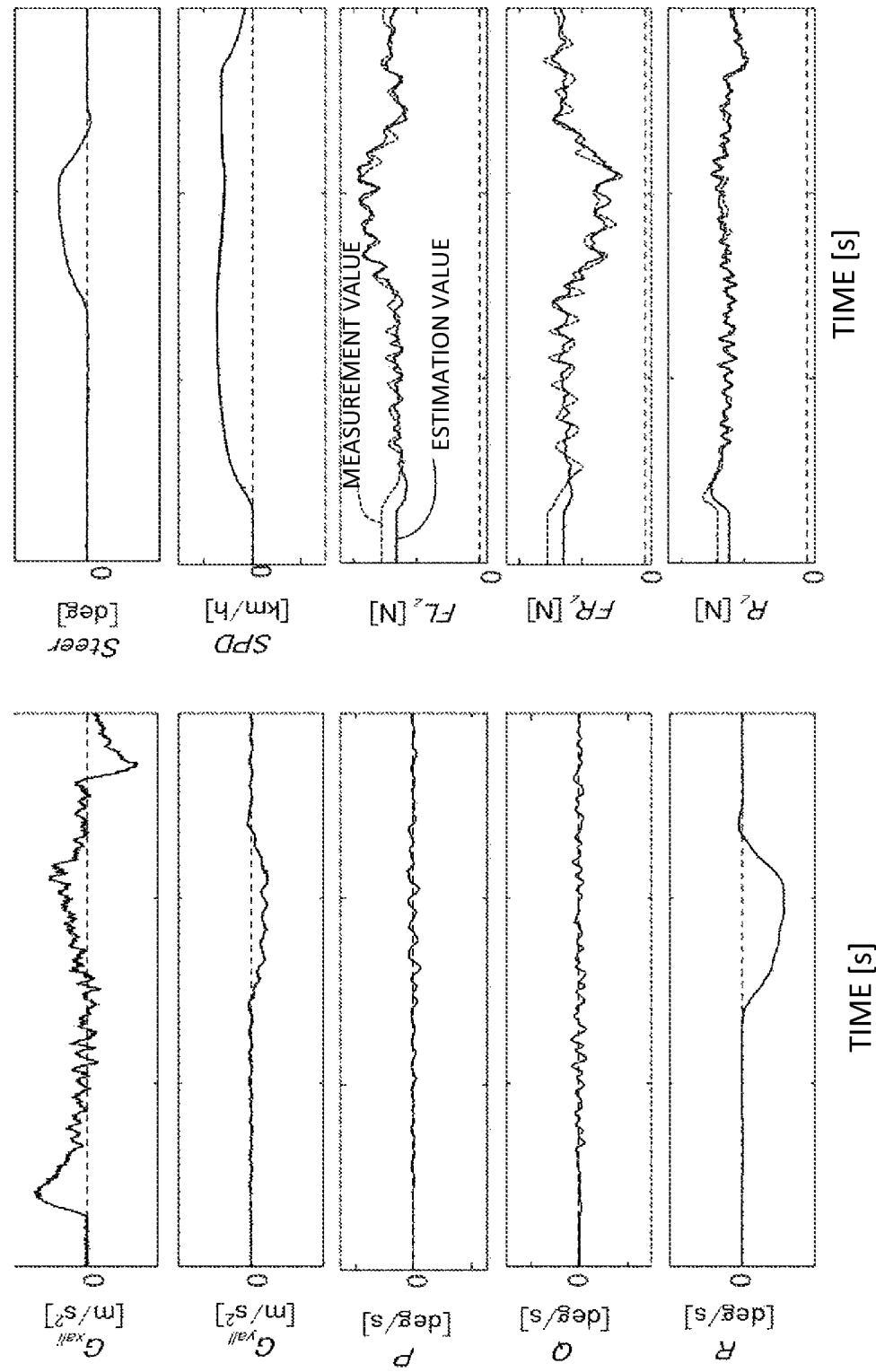
FIG. 11 is a diagram showing an example of a wheel load estimation result.

FIG. 11 shows an example of the wheel load estimation result in the case where a three-wheel forklift travels forward and turns right. In FIG. 11, estimation values of the respective wheel loads estimated by the equation (20) are compared with measurement values obtained by actually measuring the wheel loads. As shown in FIG. 11, the estimation values roughly coincide with the measurement values of the wheel loads. This means that the wheel loads are accurately estimated.

The following will describe a result of confirming the effect of changing an inertia value depending on the lift height. FIG. 12 shows a result of estimating the respective wheel loads by the equation (20) in the case where the three-wheel forklift having a load of 800 kg and a lift height of 1.5 m travels at the time of rearward braking operation. FIG. 12A shows a case where the inertia tensor $J_{all}$ is set at a lift height of 0.2 m without considering the actual lift height, and FIG. 12B shows a case where the inertia tensor $J_{all}$ is set at a lift height of 1.5 m, which is the same as the actual lift height. As shown in FIG. 12, in the case where the wheel load is estimated using $J_{all}$ when the lift height is set to 0.2 m, an estimation error is large. On the other hand, in the case where the wheel load is estimated using $J_{all}$ when the lift height is set to 1.5 m, which is the same as the actual lift height, the estimation error is small. As a result, it is possible to confirm the effect of changing the inertia value depending on the lift height.

Figure 13A:
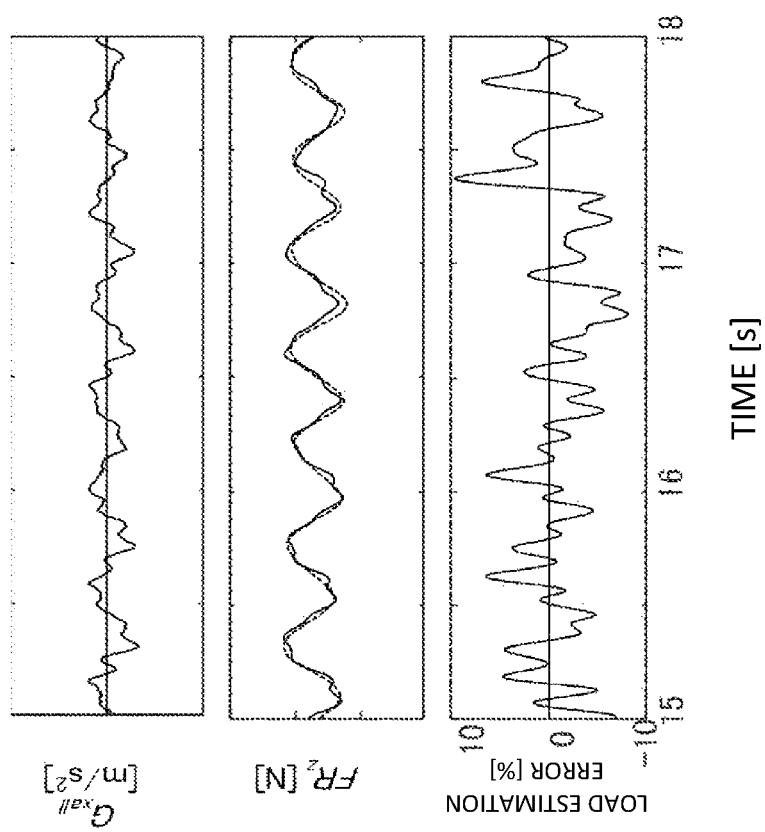
FIGS. 13A and 13B are diagrams for explaining a comparison of wheel load estimation results based on whether inertial products are considered.
Figure 13B:
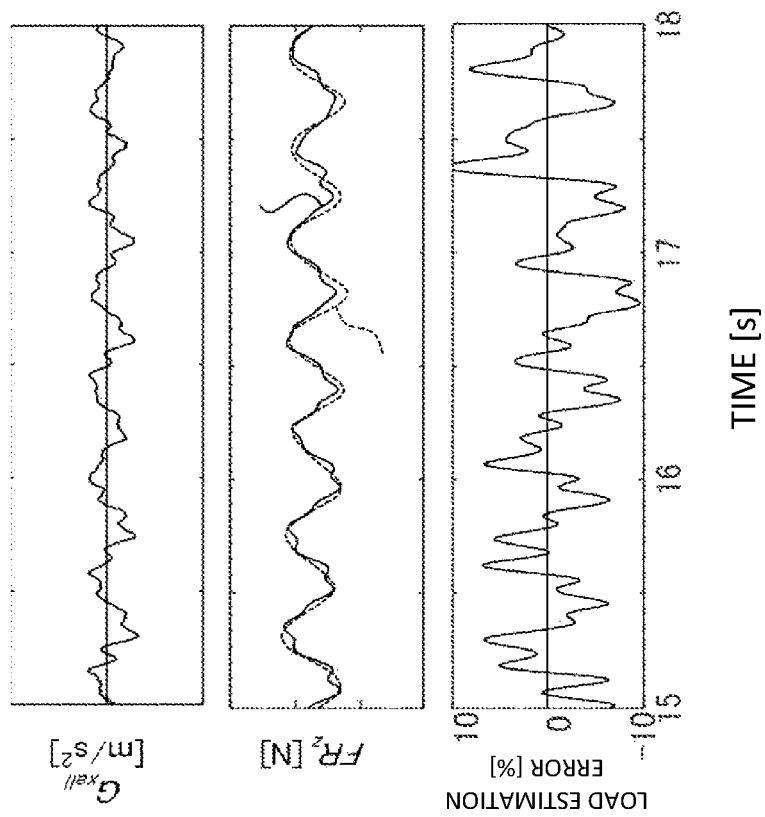

Next, in FIG. 13, a comparison of estimation results of the wheel load based on whether or not the inertial products are considered when the forklift travels as in FIG. 12 will be described. FIG. 13A shows a case where there is no inertial product element, and FIG. 13B shows a case where there are inertial product elements. In each case, the lift height at the time of the calculation of the inertia tensor $J_{all}$ is 1.5 m, and only the influence of the setting of the inertial product elements is considered in the comparison. As shown in FIG. 13, due to the setting of the inertial product elements, the estimation error of the wheel load is reduced. Even in the case where there is no inertial product element, it is possible to accurately estimate the wheel load to some extent, so that the consideration of the inertial products is not essential in the present. In the case where the inertial products are not considered, the off-diagonal elements of the inertia tensor $J_{all}$ may be 0 in the above-described embodiments.

The wheel load estimation process that the CPU executes after reading software (program) in the above-described embodiments may be executed by a variety of processors other than the CPU. Examples of the processors in this case include a PLD (Programmable Logic Device) in which the circuit configuration is changeable after the production, as exemplified by an FPGA (Field-Programmable Gate Array), and a dedicated electric circuit that is a processor having a circuit configuration specially designed for executing a specified process, as exemplified by an ASIC (Application Specific Integrated Circuit). The wheel load estimation process may be executed by one of the variety of processors, or may be executed by a combination (for example, a combination of a plurality of FPGAs, a combination of a CPU and an FPGA, or the like) of two or more processors of the same kind or different kinds. More specifically, the hardware structure of the variety of processors is an electric circuit in which circuit elements such as semiconductor elements are combined.

In the above embodiments, the aspect in which the wheel load estimation program is stored (installed) in the storage device in advance is described, but the present disclosure is not limited to this aspect. The program may be stored in a storage medium such as a CD-ROM, a DVD-ROM, a Blu-ray disc, and a USB memory. The program may be also downloaded from an external device through a network.

REFERENCE SIGNS LIST 10, 210 wheel load estimation device
12 front-rear acceleration obtaining unit
14 lateral acceleration obtaining unit
16 roll angular velocity obtaining unit
18 pitch angular velocity obtaining unit
20 yaw angular velocity obtaining unit
22 loading load obtaining unit
24 loading position obtaining unit
26 lift height obtaining unit
28 tire front-rear force obtaining unit
30 tire lateral force obtaining unit
32 angular acceleration calculation unit
34 vehicle specification DB
36, 236 center-of-gravity inertia value calculation unit
38 yaw moment calculation unit
40, 240 wheel load variation calculation unit
42, 242 wheel load estimation unit
44 communication I/F
52 CPU
54 memory
56 storage device
58 input device
60 output device
62 storage medium reader
66 bus
100 whole vehicle
102 vehicle body
104 loading object
106 fork
108 outer mast
110 inner mast
114 pressure sensor
116 encoder
118 operation amount sensor

The invention claimed is:

1. A wheel load estimation device comprising:
at least one processor configured to:
obtain angular velocities and angular accelerations of a rigid body around three axes of the rigid body including an element, accelerations of the rigid body in a front-rear direction being a traveling direction of the rigid body and in a lateral direction being a width direction of the rigid body, a weight of the element, and a position including a height of the element, the element fluctuating a center of gravity of the rigid body;
calculate information relevant to the center of gravity of the rigid body and an inertia value including an inertial principal axis around the center of gravity of the rigid body;
calculate variation amounts of wheel loads that each act on a corresponding one of a plurality of wheels supporting the rigid body based on the angular velocities, the angular accelerations, the accelerations in the front-rear direction and the lateral direction obtained, and the information relevant to the center of gravity of the rigid body and the inertia value calculated; and
estimate the wheel loads based on the variation amounts of the wheel loads calculated and static loads that act on the respective wheels;
control an operation of the rigid body based on the wheel loads estimated.

2. The wheel load estimation device according to claim 1, wherein the at least one processor is further configured to:
calculate a position of the center of gravity of the rigid body including the element and respective positions of centers of gravity of a plurality of constituent parts constituting the rigid body based on the weight and the position of the element obtained and respective structures of the constituent parts, and
calculate the inertia value using differences between the position of the center-of-gravity of the rigid body including the element and the respective positions of the centers of gravity of the constituent parts.

3. The wheel load estimation device according to claim 1, wherein the at least one processor is further configured to:
calculate the inertia value further including inertial products.

4. The wheel load estimation device according to claim 1, wherein the at least one processor is further configured to:
obtain lateral forces and front-rear forces that act on the wheels, and
calculate the variation amounts of the wheel loads further using a yaw moment around the center of gravity of the rigid body, the yaw moment being calculated based on the lateral forces and the front-rear forces obtained.

5. The wheel load estimation device according to claim 1, wherein the at least one processor is further configured to:
calculate a yaw moment around the center of gravity of the rigid body together with the variation amounts of the wheel loads under a constraint that a total sum of the respective variation amounts of the wheel loads on the plurality of wheels is 0.

6. The wheel load estimation device according to claim 1, wherein
the rigid body is a vehicle, and the element fluctuating the center of gravity of the rigid body is a loading object that is loaded on the vehicle.

7. The wheel load estimation device according to claim 6, wherein
the vehicle is a forklift, and the loading object is loaded on forks being operable vertically.

8. The wheel load estimation device according to claim 1, wherein
the information relevant to the center of gravity of the rigid body includes a distance in a vertical direction between the position of the center of gravity of the rigid body and a roll center of the rigid body, a position of the center of gravity of the rigid body in the lateral direction, and respective distances in the lateral direction between the plurality of wheels and the position of the center of gravity of the rigid body.

9. A wheel load estimation device comprising:
at least one memory configured to store wheel load estimation computer program code; and at least one processor configured to access the at least one memory and operate as instructed by the wheel load estimation computer program code, the wheel load estimation computer program code including:

obtaining code configured to cause the at least one processor to obtain angular velocities and angular accelerations of a rigid body around three axes of the rigid body including an element, accelerations of the rigid body in a front-rear direction being a traveling direction of the rigid body and in a lateral direction being a width direction of the rigid body, a weight of the element, and a position including a height of the element, the element fluctuating a center of gravity of the rigid body;

center-of-gravity inertia value calculation code to cause the at least one processor to calculate information relevant to the center of gravity of the rigid body and an inertia value including an inertial principal axis around the center of gravity of the rigid body;

wheel load variation calculation code to cause the at least one processor to calculate variation amounts of wheel loads that each act on a corresponding one of a plurality of wheels supporting the rigid body based on the angular velocities, the angular accelerations, the accelerations in the front-rear direction and the lateral direction obtained, and the information relevant to the center of gravity of the rigid body and the inertia value calculated; and wheel load estimation code to cause the at least one processor to estimates the wheel loads based on the variation amounts of the wheel loads calculated and static loads that act on the respective wheels; and control code to cause the at least one processor to control an operation of the rigid body based on the wheel loads estimated.

* * * * *